United States Patent
Poirier et al.

(12) 
(10) Patent No.: US 6,820,367 B2
(45) Date of Patent: Nov. 23, 2004

(54) DRILL/INJECTOR COMBINATION FOR PLUG FERTILIZATION AT LIFT

(75) Inventors: Marc Poirier, Campbell River (CA); John Kitchen, Vancouver (CA); Mark Ingram, Saskatoon (CA); Ted Bay, Humbolt (CA); Andrew Jackson, Humbolt (CA); Kyle Krushelniski, Saskatoon (CA); Philip Leduc, Humbolt (CA); Troy Lucyshyn, Humbolt (CA); Bradley Pauli, Humbolt (CA); Andrew Rauert, St-Gregor (CA)

(73) Assignee: Pacific Regeneration Technologies Inc., Campbell River (CA)

( * ) Notice: Subject to any disclaimer, the term of this patent is extended or adjusted under 35 U.S.C. 154(b) by 0 days.

(21) Appl. No.: 10/245,262

(22) Filed: Sep. 16, 2002

(65) Prior Publication Data

US 2004/0049974 A1 Mar. 18, 2004

(51) Int. Cl.[7] .................................................. A01G 9/08
(52) U.S. Cl. .................................. 47/1.01 P; 47/1.01 R
(58) Field of Search ........................ 47/1.01 R, 1.01 P; 111/101, 105

(56) References Cited

U.S. PATENT DOCUMENTS

| | | |
|---|---|---|
| 997,674 A | 7/1911 | Heikes |
| 1,486,431 A | 3/1924 | Harvey |
| 2,765,957 A | 10/1956 | Andres |
| 3,012,370 A * | 12/1961 | Lortz et al. ............... 47/1.01 R |
| 3,605,921 A * | 9/1971 | Mayer ........................ 175/108 |
| 3,656,661 A | 4/1972 | Schumacher et al. |
| 4,053,088 A | 10/1977 | Grataloup |
| 4,215,824 A | 8/1980 | Weiste |
| 4,246,854 A | 1/1981 | Lempa, Jr. |
| 4,280,419 A | 7/1981 | Fischer |
| 4,307,822 A | 12/1981 | Hardesty |
| 4,376,601 A | 3/1983 | Laseter |
| 4,379,664 A | 4/1983 | Klein et al. |
| 4,495,875 A | 1/1985 | Makkink |
| 4,637,328 A | 1/1987 | Topham et al. |
| 4,903,618 A | 2/1990 | Blair |
| 4,907,516 A | 3/1990 | Rogers |
| 4,934,287 A | 6/1990 | Guin et al. |
| 4,947,579 A * | 8/1990 | Harrison et al. ......... 47/1.01 R |
| 5,024,356 A | 6/1991 | Gerling et al. |
| 5,050,340 A | 9/1991 | Seifert |
| 5,105,578 A | 4/1992 | Fleuridas et al. |
| 5,189,965 A | 3/1993 | Hobbs et al. |
| 5,225,345 A | 7/1993 | Suzuki et al. |
| 5,365,693 A * | 11/1994 | Van Wingerden et al. ....................... 47/1.01 R |
| 5,394,812 A | 3/1995 | Dunning et al. |
| 5,429,305 A | 7/1995 | Munsey |
| 5,487,236 A | 1/1996 | Moon |
| 5,727,484 A | 3/1998 | Childs |
| 6,138,591 A | 10/2000 | Horsch |
| 6,237,514 B1 | 5/2001 | Romans |
| 6,273,648 B1 | 8/2001 | Poncelet et al. |
| 2004/0049974 A1 * | 3/2004 | Poirier et al. ............. 47/1.01 P |

FOREIGN PATENT DOCUMENTS

| | | | | |
|---|---|---|---|---|
| JP | 11009018 A | * | 1/1999 | ............ A01C/7/20 |
| JP | 2002017169 A | * | 1/2002 | ............ A01G/9/08 |
| JP | 2003116364 A | * | 4/2003 | ............ A01G/9/08 |

* cited by examiner

Primary Examiner—Jeffrey L. Gellner
(74) Attorney, Agent, or Firm—Robert H. Barrigar

(57) ABSTRACT

A drill/injector combination is provided to inject plants that are grown in containers such as blocks at lift with plant growth modulators. The drill/injector combination is comprised of a seedlings holder, a block restraint, a cavity tool apparatus, a metering apparatus, an injection apparatus and optionally, a bore closing apparatus. The combination may be manually operated or may be automated.

34 Claims, 19 Drawing Sheets

DRILL/INJECTOR COMBINATION FOR PLUG FERTILIZATION AT LIFT

BACKGROUND OF THE INVENTION

Reforestation is often carried out by outplanting seedlings that have been grown in seedling nurseries. The seedlings may be bare root stock or, more commonly, the root is enveloped in growth medium in the form of a plug in a container—this latter is referred to as containerized stock. Outplanting of containerized stock, therefore, involves placing the plug into soil at the reforestation site.

For the purposes of this specification, the term "plug" will be considered to include pellets—for example, Jiffy™ pellets—and any other suitably retained growth medium, for example, growth medium in multiple cavity containers such as styroblocks. A number of plugs are typically retained in a block. For the purposes of this specification, the term block will, therefore, refer to any container that has a plurality of cavities each which holds a plug. Further, the term "fertilizer" will be considered to include both organic and inorganic forms of fertilizer.

To produce containerized stock, the seedlings are seeded directly into the plug, which has been prepared in advance, by filling a plug cavity with a growth medium. Typically, the growth medium is inert and is, for example, comprised of peat or a mixture of peat, vermiculite and sand. As the medium is very low in plant nutrients, fertilizer is provided either as a slow-release fertilizer that is included in the mix, or through fertigation.

Commonly, slow-release fertilizers are available as prills. In this context, "prill" is encapsulated fertilizer in the form of a bead. A prill in the context of conifer seedlings growth is chemical or organic fertilizer encased in a polymeric coating made of plastic. Alternatively, granular formulations, both organic and inorganic, may be used that slowly release the fertilizer. These slow-release fertilizers may be added to the plug at the time of sowing with the objective of providing a residual load to the seedling once it is lifted and outplanted. However, regardless of the type of slow-release fertilizer used, much of it has been expended by the time the seedling is ready to be lifted.

Once a seedling reaches the prescribed height, caliper and developmental stage, it is lifted. At this time, it may be outplanted directly, as occurs with the "hot lift" seedlings, or it may be placed in cold storage, where it will remain over the winter. At the end of the cold storage period, the seedling is thawed and outplanted directly into the reforestation site.

Establishment of the seedling in the reforestation site is a critical step in the reforestation process. Hence there has been research on methods of increasing the rate of early growth. Frequently, seedling growth following outplanting is limited by a lack of adequate nutrients.

Research to increase the availability of nutrients to the seedling following outplanting has been extensive and has focussed on such techniques as co-cultivating mycorhizal fungi with the seedling roots in the nursery, placing fertilizer "tea bags" in a hole next to the hole that the plug is planted into at the reforestation site (U.S. Pat. Nos. 5,022,182 and 5,317,834), and studying root growth to determine ways to increase the seedling's access to the limited soil nutrients. Limited fertilizer spray programs have also been implemented, but unfortunately, these often result in the brush and weeds outgrowing the seedlings. When this occurs, the brush and weeds have to be controlled, adding further expense to the cost of reforestation.

Despite the concern about the availability of nutrients to the seedling following outplanting, fertilization at lift, rather than at or following outplanting, does not appear to have been actively pursued. Hence the prior art for such an approach appears to be limited to field crop fertilizers, crop seeders and the lifting and packaging equipment currently employed in seedling nurseries.

There are many patents that disclose devices and methods for injecting materials, including fertilizer into soil. These have been developed for field crops, and not for containerized crops, such as conifer seedlings. For example, U.S. Pat. No. 5,394,812 discloses a device and method to inject polymeric materials into soil. The invention is based on a fluid delivery system, with pumps and monitors to control the flow rate. The monitor is in the form of a float valve. The fluid with the polymer therein is delivered to a series of apertures by means of a high pressure pulse.

U.S. Pat. No. 4,907,516 discloses a device and method for pulsed injection of liquid fertilizer into the soil. A solenoid control valve operates intermittently to interrupt the flow of liquid in order to provide liquid fertilizer to the nozzle in a series of short pulses. Penetration of the fertilizer into the soil is dependent upon the force of the jet of liquid through the nozzle.

Seeders for various purposes are previously known. U.S. Pat. No. 6,237,514 discloses an apparatus and method for disbursing agriculture seeds and other particulate materials into soil. A hopper supplies seeds to pockets that are located on sprocket wheels. The seeds are retained in the pocket by a housing that abuts the sprocket wheels. The number of seeds that are retained in each pocket is dependent upon the seed size and the pocket size. Rotation of the sprocket wheels to an open position in the housing results in release of the seeds. The seeds drop without assistance and land on the soil. Seed bed preparation therefore is carried out separately prior to seeding.

U.S. Pat. No. 6,273,648 discloses apparatus providing even distribution of air-entrained particulate material to headers and ultimately to delivery nozzles. Specifically, the patent discloses a conveyor tube and distribution header for use with pneumatic seeders. Turbulence is used within the conveyer tube to propel the seeds toward the distribution head. The distribution head receives the seeds through a flow inlet and then divides the flow into a number of outlet ports.

Another apparatus for dispensing granular or particulate materials is disclosed in U.S. Pat. No. 5,189,965. The apparatus is designed to uniformly discharge a predetermined quantity of granular material at a predetermined rate of application. A hopper is used to feed a metering system that has a number of rollers with pockets to receive the granular material. As the rollers turn, the granular materials are released into segregated metering channels and are pneumatically propelled through a delivery system. Hence, a continuous stream of granular or particulate materials is dispensed onto the soil.

The nursery industry employs mechanized planters for emblings (somatic embryos) and seeds. Essentially, a dibbler is used to create a depression in the seed bed and seeds or emblyings are dropped into the depression. The seed bed may be a transplant bed. Alternatively, the seeds may be sown directly into the plugs. The plugs are arranged in a block such as a styroblock.

Typical styroblocks are each comprised of a styrofoam-type polymer in the form of a block with plug cavities. The plug cavities are generally slightly conical and are wide at the top of the block, narrowing to a small hole at the bottom of the block. The number of plug cavities is variable, as are the size and volume of the plug cavities; all are dependent upon the stock type that is being grown or the desired specifications of the final product.

The process of lifting the seedlings from the blocks in preparation for cold storage or planting is generally mechanized, although the operation is still done manually at some nurseries. Usually, the block is grasped in a holding device, a series of pins are aligned with the plugs in a row-by-row manner and the pins are pushed into the plugs pneumatically, resulting in extraction of the seedlings in their plugs. The seedlings then fall onto a moving culling bed, where they are manually checked for size and morphology, grouped into sets of seedlings and wrapped as bundles in a plastic-type film, such as Saran™.

To Applicant's knowledge, fertilization at lift has not previously been integrated into the lifting process. This, in part, reflects the difficulties in developing machinery and methodology that can be integrated into the nursery operations, and that does not damage the seedlings.

At lift, the plugs are small, soft and wet. Furthermore, they are close together, especially in the size 410 blocks (112 plugs of 80 mL), which are the most common block size used. The plugs are easily dislodged from the blocks, as the blocks are designed for easy removal of the seedlings at lift. The styroblocks must be treated with care as they are not very durable or rigid.

The preferred fertilizer for fertilizing conifer seedlings at lift is a slow-release prill or a granular type of fertilizer. The prills are fragile, as the outer coating is usually a thin, plastic polymer. The plastic coating is also hygroscopic and consequently, becomes soft and sticky in high-humidity environments. Similarly, granular fertilizer is hygroscopic and will become soft and sticky in high-humidity environments. Additionally, both granular fertilizer and prills tend to adhere to surfaces when force is applied. This makes mechanical insertion difficult as they will tend to clog the injection tubes.

The seedlings are also fragile. The aerial tissue is frequently tall, with many needles, but little branching. The root system is often quiescent at the time of lift, and therefore more susceptible to damage.

Any mechanized method of application has to accommodate the foregoing constraints.

SUMMARY OF THE INVENTION

An aspect of the present invention is a drill/injector combination that delivers various plant growth modulators (e.g. fertilizer, pesticide etc.) to a plug at lift. Lift may occur prior to transplanting, as occurs in a transplant nursery, or prior to cold storage, or prior to outplanting. In each case, injection of plant growth modulators into the interior of the plug from the plug's top surface, as contrasted with deposit of such material onto the surface of the plug, could result in perturbation of the seedling.

Examination of seedling morphology indicates that there are a large number of crown roots at the top of the plug. In addition, the location of the stem is variable in the plug and the seedling has substantial aerial tissue. These factors may make it difficult to inject fertilizer into the top of the plug, as damage to the any part of the plant including the root system, stem or aerial tissue could reduce outplanting success, measured as survival and growth in the first few years following outplanting. Consequently, injection is preferably into the bottom of the plug. The present invention provides an apparatus for injection of the plant growth modulator into the bottom of the plug, preferably by pneumatically injecting the plant growth modulator into the plug.

As mentioned above, the hole at the bottom of the plug is small. This places a size constraint on the injection equipment.

For injection into the bottom of the plug, the blocks are preferentially placed on their sides. This promotes retention of a specific dose of fertilizer; if the blocks are upright and the plugs are injected from below, the fertilizer tends to fall out of the plug—even when all the operations are performed with the seedlings on their side there is loss of fertilizer. Further, more air pressure and a higher air flow would be required to inject from below as compared with injecting from the side. As a consequence, the seedlings should be supported, as they may bend and be damaged if left unsupported.

In order to successfully inject plant growth modulator into the plug, it is preferable to pre-form a bore and a port in the plug. The bore is preferably formed by drilling with a cavity drilling tool which is comprised of a specially formed drill bit and a suitable drive. Drilling is preferably through the bottom of the plug. As the drill bit reaches the end of its stroke, a distal tip of the drill bit penetrates a top end of the plug and produces the port. The port allows air to be expelled from the bore. By having a shoulder on the drill bit between a wide cylindrical body and a narrow distal tip, a shoulder is created within the bore. The narrowing of the bore afforded by the shoulder impedes movement of the plant growth modulator from the bore into the port. Further, the smaller diameter of the narrow distal tip and its flexibility reduces the risk of damage by the drill bit to the seedling.

In order to optimize the injection procedure, the charge (dose) of plant growth modulator injected into each plug should be controlled. Assuming that a metering system of the sort disclosed in U.S. Pat. No. 5,189,965 is used, the correct dose can be applied by selecting the appropriate metering roller, which forms part of the metering roller apparatus. Each metering roller has pockets sized to deliver a specific amount of plant growth modulator, and different rollers have different pocket sizes. Once the dose has been determined, the appropriate metering roller is used to deliver plant growth modulator to the to the individual injectors, which deliver the charge to the plug. This is preferably accomplished with a pneumatic injection system.

Once the plug has been injected, it is preferable to close the bore at the bottom of the plug. This can be accomplished with a bore closer or a paste injector. Closing the bore facilitates retention of the plant growth modulator in the bore.

Preferably, drilling occurs in at least one self-contained set of plugs, while at the same time injection is occurring in at least one adjacent self-contained set of plugs, while bore closing is occurring in yet another self-contained set of plugs. The sets are then laterally displaced so that the drilled set is positioned for injection, the injected set are positioned for closing, the closed set removed, and a fresh set is positioned in place for drilling, thereby minimizing the time required to drill, inject and close a series of such plug sets. The "set" of plugs may conveniently be a row of plugs in a block, or in a more expensive facility, could be an entire block of plugs, provided that the plugs may be maintained in satisfactory alignment for the drilling and injection operations. Accordingly, it is preferable to align and then restrain the block during drilling. An indexing bar is employed to align the various tools with the plugs, and a clamp holds both a block restraint and a seedling holder in place.

The seedling holder reduces damage to the aerial tissue of the seedlings, by supporting and holding them in one place during the drilling, injecting and closing operations. Preferably, the seedling holder is comprised of a series of guides spaced to accept a row of seedlings, that slide between the row and support the aerial tissue of the seedlings. More preferably, the seedling holder has a series of dividers. The dividers are biased from the guides in an open position to allow the seedling to slide into place, and then close onto the guides in the closed position to hold the seedlings.

In the preferred embodiment of the invention, the operations are automated, and may, for example, be controlled by a timer, a micro-controller or a microprocessor.

In one embodiment of the invention, a drill bit is provided for preparing a plug for subsequent injection of plant growth modulator into the plug. The drill bit has a distal end, a body and a shoulder between the distal end and the body. A bore is created in the plug by the drill bit by rotating the tool with a suitable drive. Exit of the distal end of the drill bit through the top of the plug results in the formation of a port for release of air during injection of the plant growth modulator into the bore. The drill bit is preferably comprised of a malleable metal such as aluminum.

In another embodiment of the invention, a cavity drilling apparatus is provided, which comprises a series of drill bits that are rotationally mounted along a head and spaced in order to align with the plugs of the container. At least one coaxially mounted bearing locates the drill bits in the head. The drill bits are coupled to a suitable drive.

In one embodiment of the invention, a metering apparatus is provided, comprising a metering roller, at least two bolts and a perforated cover. The metering roller has a series of pockets, sized to accept a specific and predetermined amount of plant growth modulator. Rotation of the metering roller from a first position, wherein the pockets accept plant growth modulator, to a second position, wherein the pockets are aligned with perforations in the perforation plate results in plant growth modulator being delivered in specific and predetermined doses. The metering roller is rotatably mounted on the perforation plate by at least one bolt at one end and at least one bolt at the opposing end. The metering roller is preferably comprised of a high density plastic polymer. Preferably, the metering roller further comprises a flap. The flap extends the length of the metering roller and rests on the metering roller.

In a preferred embodiment of the invention, the metering roller preferably subtends a hopper.

In one embodiment of the invention, an injector is provided to inject plant growth modulator into a plug. The injector is comprised of a pneumatic injection tube, a propellant port, a charge collection chamber and a nozzle. The collection chamber is located between the propellant port and the nozzle and is proximal to the metering apparatus. Plant growth modulator that collects in the collection chamber is forced into the plug in a discrete charge. Preferably, the plant growth modulator is air-entrained.

In another embodiment of the invention, an injection apparatus is provided, which comprises a series of injectors that are positioned on a head. The injectors are spaced in order to align with the plugs of the container during injection of the bores.

In another embodiment of the invention, a bore closing tool is provided.

In another embodiment of the invention, a bore closing apparatus is provided, which comprises a series of bore closers that are positioned on a head and are spaced in order to align with the plugs of the container during closing of the bores. Preferably, the bore closer has a paddle located on a distal end.

In an alternate embodiment of the invention, a paste extruder is provided.

In yet another aspect of the invention, a series of paste extruders are positioned on a head and are spaced in order to align with the plugs of the container during closing of the bores.

In another embodiment of the invention, there is a hydraulic injector, wherein the propellant port is replaced with a hydraulic tube which has, at a distal end, a hydraulic ram. Actuation of the hydraulic ram forces air through the pneumatic injection tube, entraining the plant growth modulator in the collection chamber, and releasing it through the nozzle.

In another embodiment of the invention, the hydraulic injector is controlled by, for example, a microprocessor, such that pulses of air are delivered to the pneumatic injection tube. Each pulse of air results in delivery of one charge of plant growth modulator. After each pulse, the collection chamber is reloaded with plant growth modulator.

In another embodiment of the invention, there is a hydraulic injection apparatus, which comprises a series of injectors that are positioned on a head and are spaced in order to align with the plugs of the container during injection of the bores.

In yet another embodiment of the invention, there is a fluid injector, comprising a fluid delivery tube, a collection chamber, a fluid injection tube and a nozzle. A pump injects fluid into the fluid injection tube from the fluid delivery tube, thereby fluid-entraining the plant growth modulator in the collection chamber, and releasing it through the nozzle.

In yet another embodiment of the invention, there is a fluid injection apparatus, which comprises a series of injectors that are positioned on a head and are spaced in order to align with the plugs of the container during injection of the bores.

In another embodiment of the invention, the fluid injector is controlled by, for example, a microprocessor, such that pulses of fluid are delivered to the fluid injection tube. Each pulse of fluid results in delivery of one charge of plant growth modulator. After each pulse, the collection chamber is reloaded with plant growth modulator.

In another embodiment of the invention there is a seedling holder comprising a framework and a series of guides and dividers. The guides are aligned to separate the seedlings into rows. Each row of seedlings is then retained by the dividers, which are articulated and can close over the seedlings.

In another aspect of the invention, a clamp clamps the seedling holder to the block restraint.

In one embodiment of the invention, there is an injection slide upon which are housed a cavity drilling apparatus, an injection apparatus and a bore closing apparatus.

In a preferred embodiment of the invention, the injection slide is further provided with a positioning dowel.

In one embodiment of the invention, there is a cavity tool and an injector. The cavity tool is comprised of a drill bit that is coupled to a suitable selected drive.

In another aspect of the invention, there is a cavity tool, an injector and a bore closing tool.

In another aspect of the invention, there is a cavity tool, an injector and a metering apparatus.

In another aspect of the invention, there is a cavity tool, an injector, a metering apparatus and a bore closing tool.

In another aspect of the invention, there is a cavity drilling apparatus and an injection apparatus.

In another aspect of the invention, there is a cavity drilling apparatus, an injection apparatus and a bore closing apparatus.

In another aspect of the invention there is a cavity drilling apparatus, an injection apparatus and a metering apparatus.

In another aspect of the invention there is a cavity drilling apparatus, an injection apparatus, a metering apparatus and a bore closing apparatus.

In another aspect of the invention there is a block restraint and an injection apparatus.

In another aspect of the invention there is a block restraint, a cavity drilling apparatus and an injection apparatus.

In another aspect of the invention, there is a block restraint, a cavity drilling apparatus, an injection apparatus and a metering apparatus.

In another aspect of the invention there is a block restraint, a cavity drilling apparatus, an injection apparatus and a bore closing apparatus.

In another aspect of the invention there is a block restraint, a cavity drilling apparatus, a metering apparatus, an injection apparatus and a bore closing apparatus.

In another aspect of the invention there is a seedling holder and an injection apparatus.

In another aspect of the invention there is a seedling holder, a cavity drilling apparatus and an injection apparatus.

In another aspect of the invention there is a seedling holder, a cavity drilling apparatus, a metering apparatus and an injection apparatus.

In another aspect of the invention there is a seedling holder, a cavity drilling apparatus, an injection apparatus and a bore closing apparatus.

In another aspect of the invention there is a seedlings holder, a cavity drilling apparatus, an injection apparatus, a metering apparatus and a bore closing apparatus.

In another aspect of the invention, there is a block restraint, a seedling holder and an injection apparatus.

In another aspect of the invention there is a block restraint, a seedling holder, a cavity drilling apparatus and an injection apparatus.

In another aspect of the invention there is a block restraint, a seedling holder, a cavity drilling apparatus, a metering roller and an injection apparatus.

In another aspect of the invention there is a block restraint, a seedling holder, a cavity drilling apparatus, an injection apparatus and a bore closing apparatus.

In another aspect of the invention there is a block restraint, a seedling holder, a cavity drilling apparatus, a metering apparatus, an injection apparatus and a bore closing apparatus.

SUMMARY OF THE DRAWINGS

FIG. 1A shows a left hand view and FIG. 1B shows a detail right hand view of the receiving tray, block restraint and seedling holder.

DETAILED DESCRIPTION OF PREFERRED EMBODIMENTS

Figure 1A:
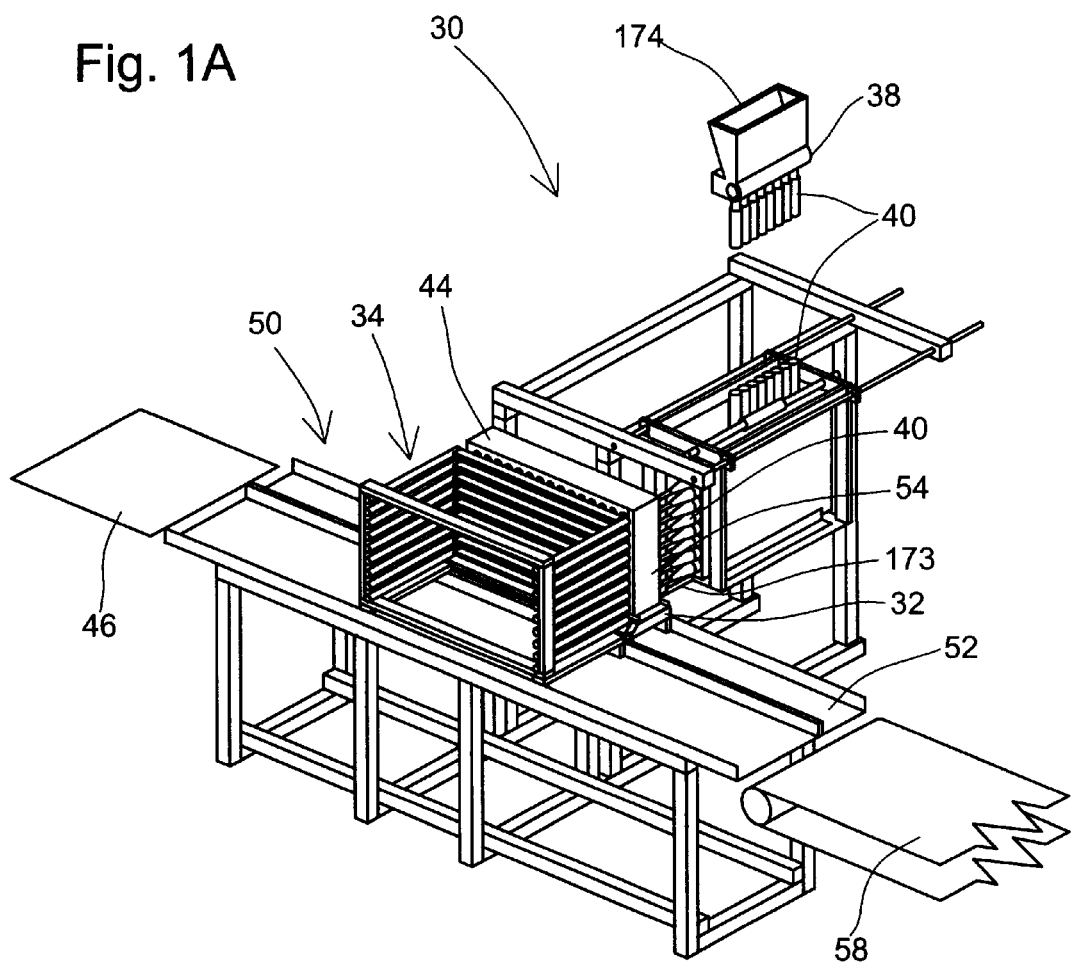
FIGS. 1A and B. An isometric view of a drill/injector combination, according to the invention.
Figure 1B:
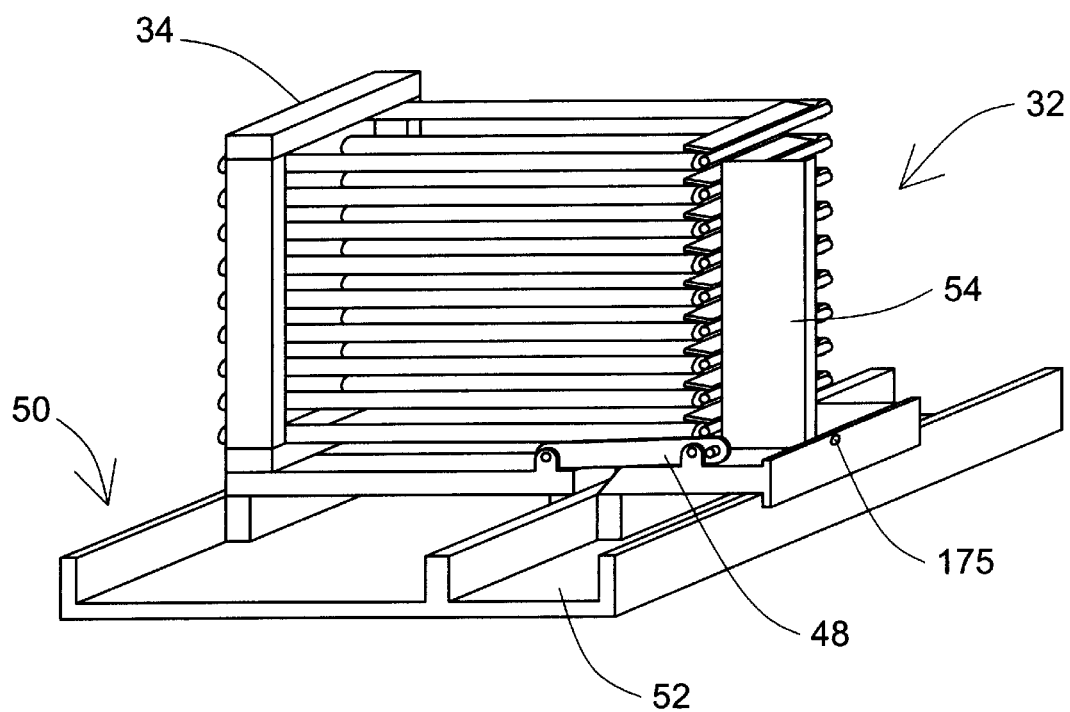
Figure 2:
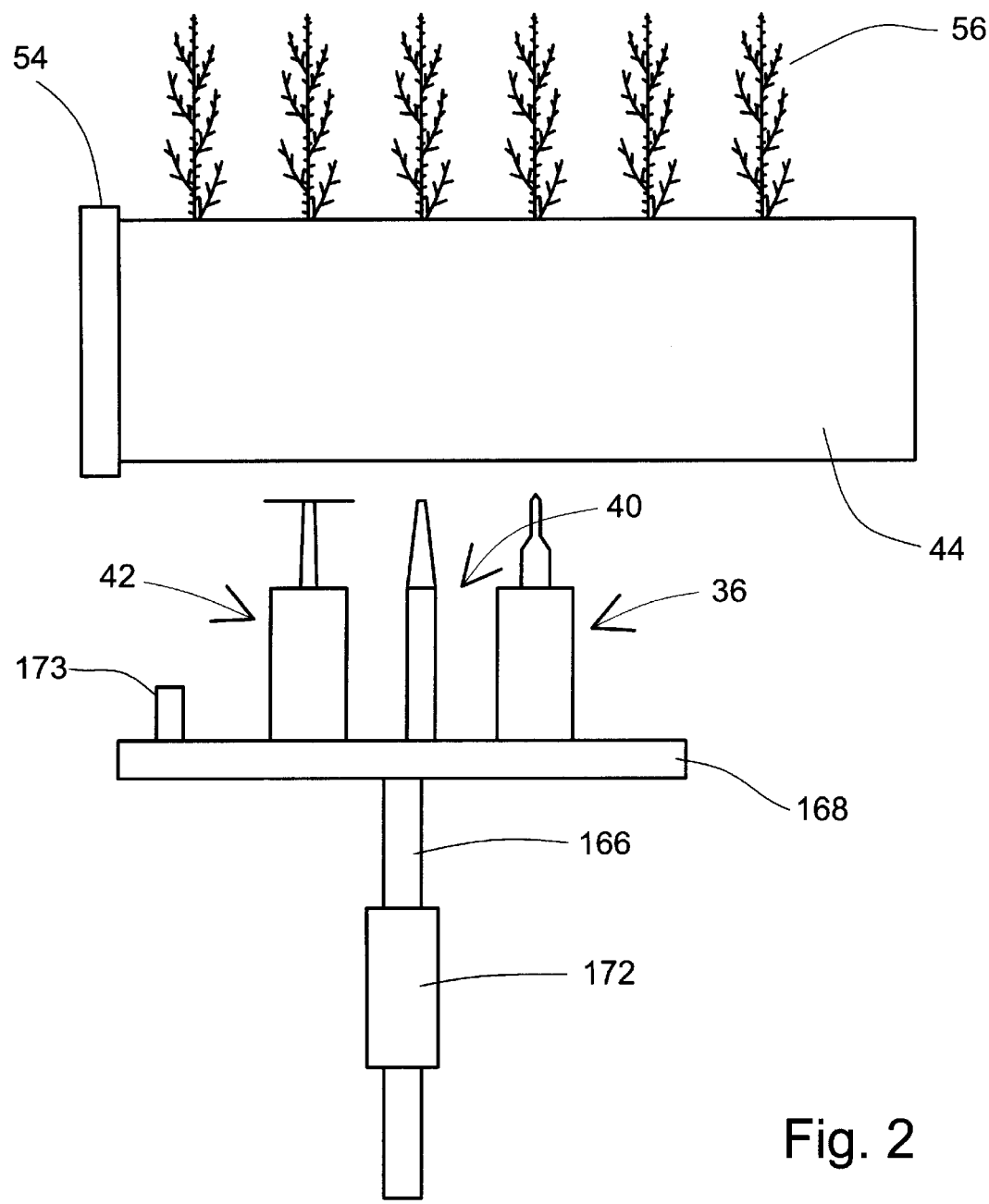
FIG. 2. A plan view of the cavity drilling apparatus, the injection apparatus and the bore closing apparatus of FIGS. 1A and 1B.

A drill/injector combination, generally indicated as 30 and shown in FIG. 1A can be integrated into standard lift operations in the nursery and is used for fertilizing plugs with prills or granular material at lift. The drill/injector combination 30 is comprised of a block restraint 32, a seedling holder 34, a cavity drilling apparatus 36, a metering apparatus 38, an injection apparatus 40, and a bore closing apparatus 42. The various systems are sub-combinations of the entire injection apparatus. Prills are the preferred form of slow release fertilizer, but they are difficult to inject because of the fragile outer coating and their hygroscopic nature. Hence, the drill/injector combination 30 is designed to accommodate these features of the prills.

Blocks 44 or other seedling containers are preferably placed on their side and are moved to the seedling holder 34 by a loading conveyor 46. Once at the seedling holder 34, the block 44 is clamped to the seedling holder 34 by a clamp 48.

The block restraint 32 is comprised of a receiving tray 50 with a channel 52 that is wide enough to accommodate the block 44 on its side. Both the receiving tray 50 and the channel 52 extend longitudinally between the loading conveyor 46 and a lifting conveyor 58. A stop 54 to receive the block 44 is preferably an L-shaped member and is mounted on the block restraint 32.

The seedling holder 34 is comprised of a series of guides 62 and dividers 64 mounted on two open boxes; a bottom box 68, and an end box 70. The bottom box 68 is mounted perpendicular to the end box 70 and holds the clamp 48 to clamp the seedling holder 34 and block restraint 32 in place on the receiving tray 50. As the block 44 moves into the seedling holder 34, the guides 62 separate the seedlings 56 into rows. Once all the seedlings 56 in the block 44 are in the seedling holder 34, and the block 44 is in the block restraint 32, both are locked in position with the clamp 48. The dividers 64 are then closed to hold the seedlings 56. This geometry facilitates maintenance of the desired alignment of the block 44 and the seedlings 56 with each other and, therefore, tends to avoid twisting and bending of the seedlings 56 by the seedling holder 34.

Two opposing side members 72, 74 of the end box 70 support the series of guides 62 and dividers 64. The guides 62 are preferably made of metal and are trapezoid-shaped plates that are preferably mounted horizontally to the side members 72, 74. The acute angle of the trapezoid is located on a loading end 78 of the seedling holder 34 such that it is proximal to the block 44. An acute angle is preferred over a right angle, as it assists in coaxing each seedling 56 onto the guide starting with the stem, which is sturdy and has few needles and ending with the fragile aerial growth.

A series of dividers 64, preferably two per guide 62 are mounted on hinges 76 that are mounted on the side members 72, 74 and extend between the side members 72, 74. The dividers extend between the side members 72, 74. The dividers 64 provide a space 82 such that a row of seedlings 56 can be moved horizontally through the space 82 when the dividers 64 are in the open position. When the dividers 64 are closed, the seedlings 56 are gently restrained. The dividers 64 are preferably made of a pliable material such as webbing or rubber, in order to reduce the potential for damage to the seedlings 56.

Figure 5A:
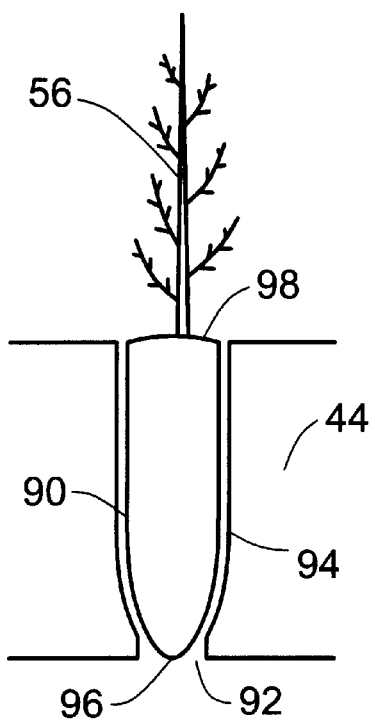
FIGS. 5A, B and C. A longitudinal mid-section view through a plug and plug cavity in a block. 5A shows the plug prior to preparation of the bore.
Figure 5B:
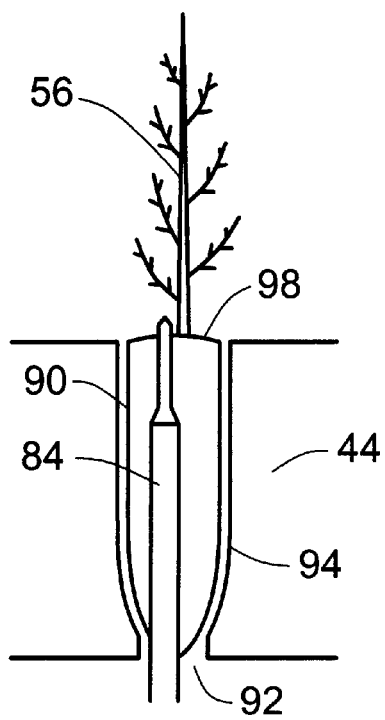
FIG. 5B shows the plug during preparation of the bore. Correct placement of a drill bit is shown according to an aspect of the invention.

Once the seedlings 56 are supported in the seedling holder 34, a drill bit 84 is employed to drill a bore 86 and a port 88 into the plug 90. As shown in FIG. 5B, the drill bit 84 enters the plug 90 through a small hole 92 that is in the bottom of each plug cavity 94, then enters the plug 90 at a bottom end 96 and progresses through the plug 90, creating the port 88 for air release at a top end 98 of the plug 90.

Figure 6:
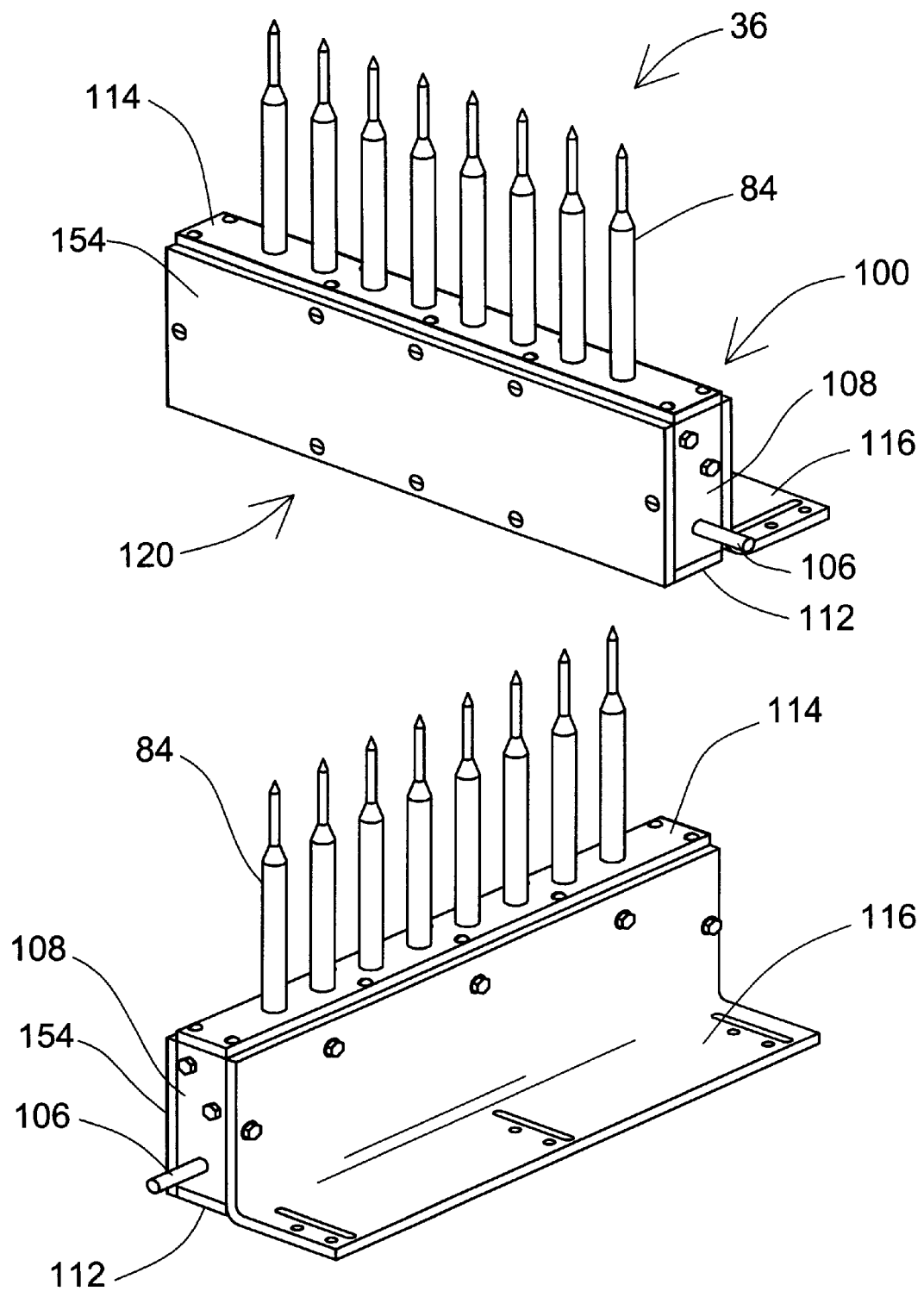
FIG. 6. An isometric view of a cavity drilling apparatus shown as part of the invention in FIGS. 1A and 1B.
Figure 7:
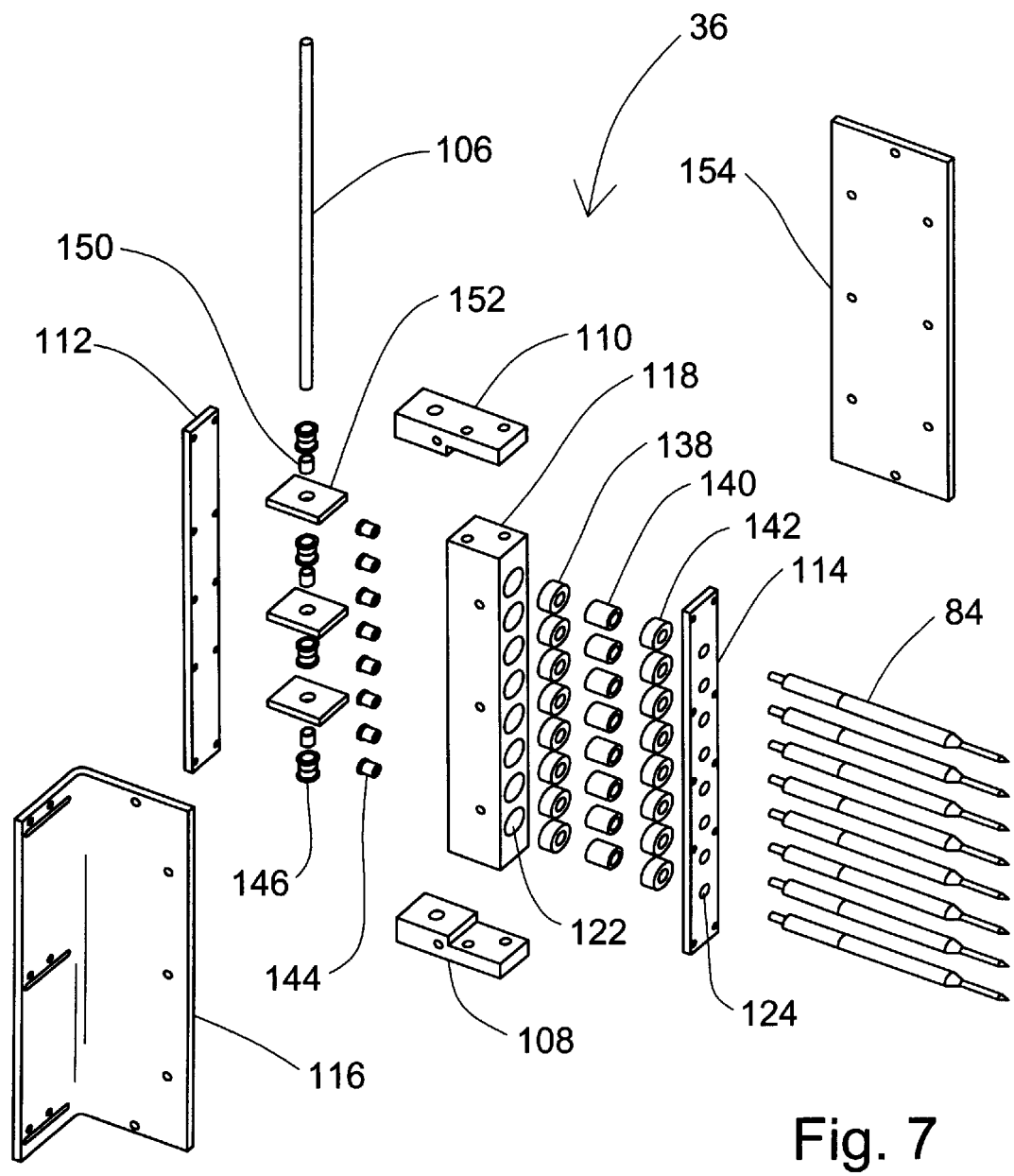
FIG. 7. An exploded view of the cavity drilling apparatus shown in FIG. 6.

Proper alignment and operation of the cavity tools 84 is provided by the cavity drilling apparatus 36. Preferably, the cavity drilling apparatus 36 is comprised of a head (generally indicated by number 100) that retains a series of cavity tools 84 that are coupled to a drive shaft 106 (FIGS. 6 and 7). As shown in FIG. 6, the cavity tools 84 are aligned along the head 100 such that they will be in alignment with the plugs 90 in at least one row. Preferably, the head 100 is sufficiently large enough to hold a gang of cavity tools 84 corresponding in number and location to the plugs 90 in a 410 block 44, the designation "410" being a size designation used in the industry. It is proposed that different heads 100 will be available for different block sizes.

The head 100 is comprised of two opposing sides 108, 110, a base 112, a top 114, a mount 116, a dust cap 154 and a drill bit holder 118. The sides 108, 110, base 112, top 114, mount 116 and dust cap 154 are attached to one another to form a box 120. The drill bit holder 118 is housed in the box 120 and is attached to the sides 108, 110 of the box 120. Apertures 122 in the drill bit holder 118 are located so as to be in register with the plugs 90 of the block 44. Similarly, the top 114 of the head 100 has a series of openings 124 that are in register with the plugs 90 of the block 44. The cavity tools 84 are positioned such that one tool 84 is aligned with one opening 124 and a corresponding aperture 122. This aligns one drill bit 84 with one plug 90. The dust cap 154 impedes entry of dust into the head 100.

Figure 8:
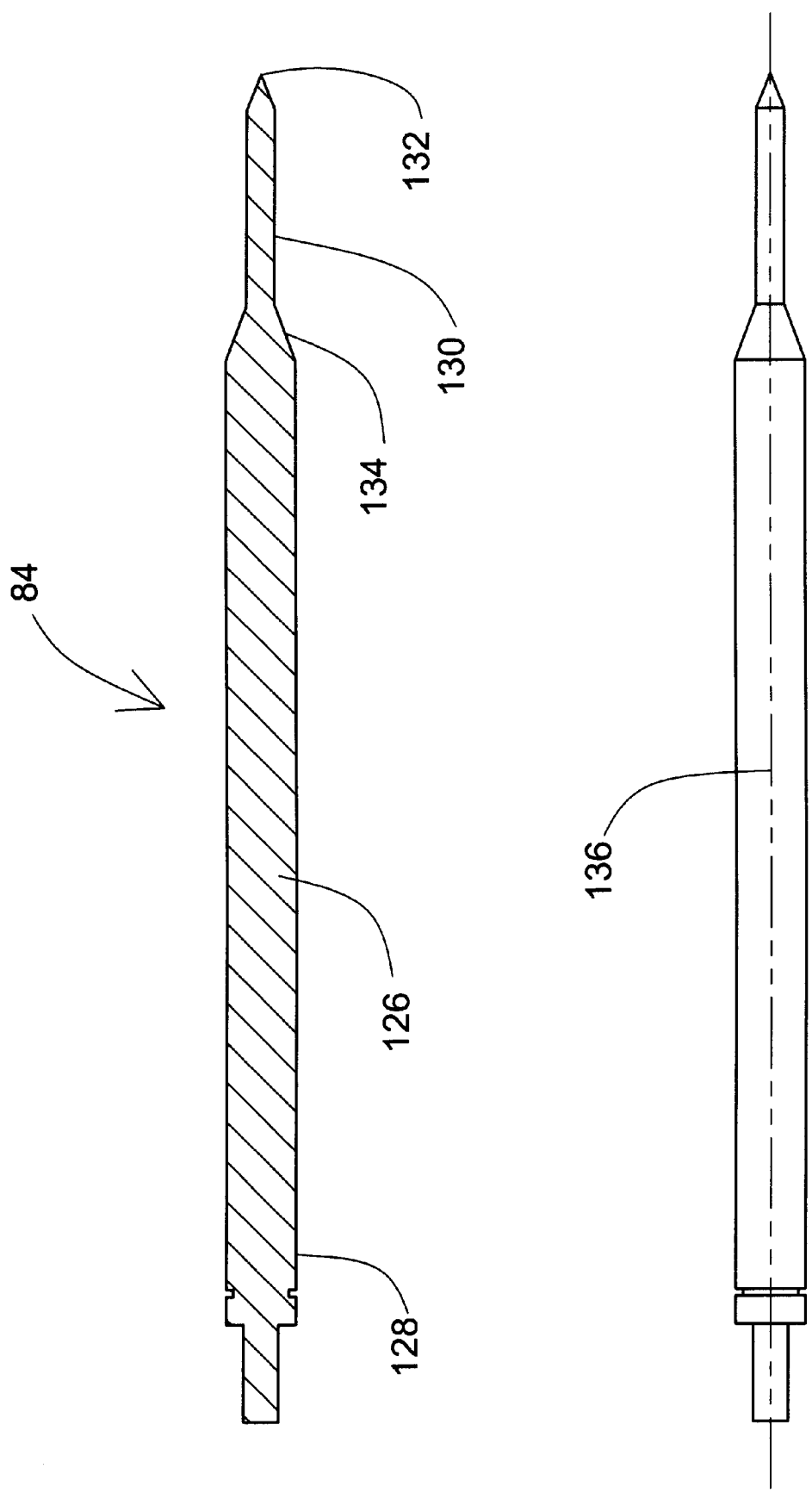
FIG. 8. A side view of the drill bit according to the invention.

The cavity tools 84 are approximately torpedo-shaped, but formed with an annular shoulder 134, for the purpose previously stated (see FIG. 8). Further, a distal tip 130 of the drill bit 84 is conical. The shape of the drill bit 84 has been shown to reduce damage to the seedling roots during drilling as the roots are pushed aside as the drill bit 84 advances. A long wide, cylindrical body 126 extends between a proximal end 128 and a distal tip 130, which is narrow and terminates in a point 132. A shoulder 134 between the cylindrical body 126 and the distal tip 130 is preferably at 20 degrees relative to a longitudinal axis 136. The distal tip 130 is long enough to extend out through the top end 98 of the plug 90. The drill bit 84 is preferably aluminum or a metal with similar malleability, or a flexible plastic polymer as harder materials may damage the roots or aerial tissue.

Rotatably mounted proximally on the drill bit 84 and located between the top 114 of the head 100 and the drill bit holder 118 is an inner bearing 138, a spacer 140 and an outer bearing 142 (see FIG. 6). The bearings 138, 142 rotatably mount the drill bit 84 in the drill bit holder 118. The proximal end 128 of the drill bit 84 is preferably mated to a first mitre gear 144 in order to drive the cavity tool. The first mitre gear 144 engages a second mitre gear 146 with a peripheral rotary engagement of approximately 90 degrees. The second mitre gear 146 is mounted coaxially on the drive shaft 106 and is driven by the shaft 106. A guide 150 on either side of the second mitre gear 146 separates it from at least one spanner 152. The drive shaft 106 is rotatably mounted on the spanners 152, which bridge the drill bit 84 holder and the top 114 of the head 100.

The cavity tools 84 are able to rotate freely about a longitudinal axis 136 and are driven by means of the drive shaft 106, which is coupled to and driven by the output shaft of a gear box (not shown). The gear box, in turn, is coupled to and driven by a motor (not shown). The rate of rotation and penetration of the cavity tools 84 is controlled to facilitate displacement of the seedling roots so that the roots are pushed aside rather than being damaged. The preferred rate of rotation in a prototype apparatus was found to range from about 80 to about 400 rpm. Penetration by the cavity tools 84 is controlled such that the tools 84 move distally longitudinally far enough to exit through the top end 98 of the plugs 90 in order to create the ports 88. The cavity tools 84 are then retracted and moved into alignment with the next row or rows of plugs 90.

Figure 9:
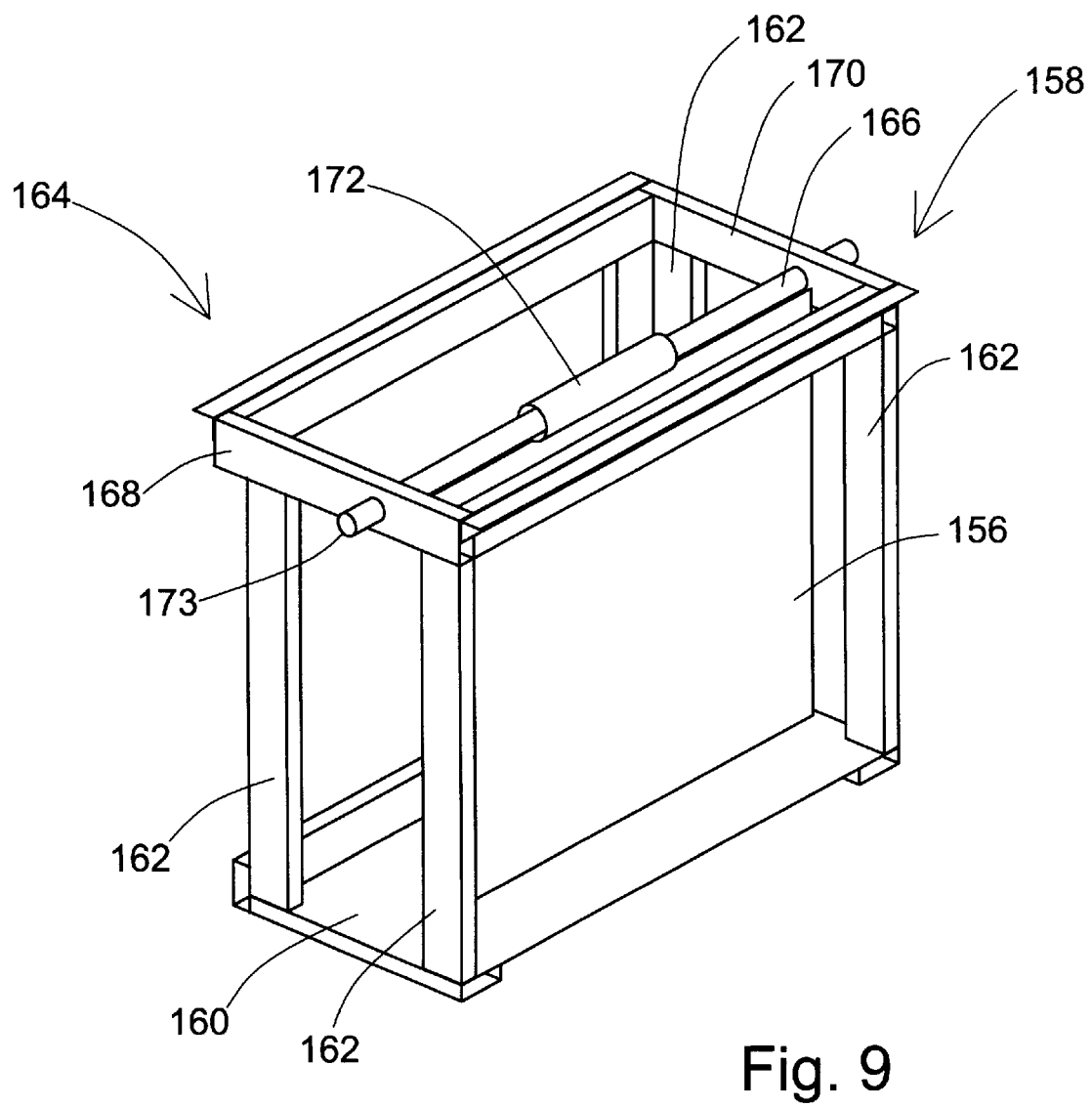
FIG. 9. An isometric view of an injection slide as shown as part of the invention in FIGS. 1A and 1B.

Placement of the cavity tools 84 is controlled by an injection slide 158. The head 100 of the cavity drilling apparatus 36 is affixed to a plate 156 by the mount 116 and the plate 156 is vertically mounted on the injection slide 158. The injection slide 158 is comprised of a foot 160, four risers 162 and a frame (generally indicated by number 164)(see FIG. 9). A support rod 166 extends between a front member 168 and a back member 170 of the frame 164. The plate 156 is coupled to a hanger 172, which hangs from the support rod 166. Movement of the head 100 towards and away from the block 44 is accomplished by sliding the hanger 172 along the support rod 166. This is preferably controlled by a press which is preferably hydraulically actuated. Correct placement of the cavity drilling apparatus 36 is promoted by a positioning dowel 173 which extends outwardly from the plate 156 and is received by an aperture 175 in the block restraint 32.

Figure 5C:
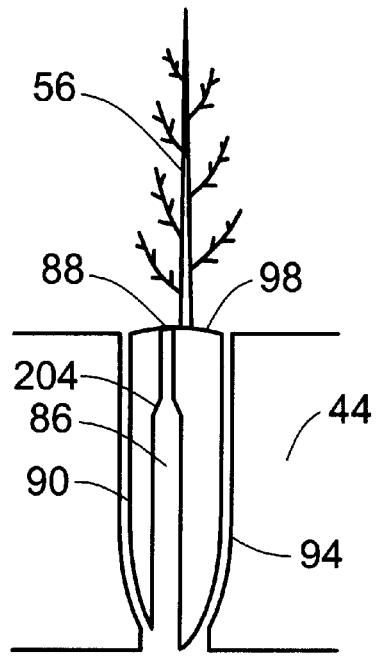
FIG. 5C shows the plug after preparation of the bore.

Correct operation of the cavity drilling apparatus 36 results in a plug 90 with a wide bore 86, which will receive the fertilizer, and a narrow port 88 for air release from the plug 90 (see FIG. 5C). Such a plug 90 is ready for injection using injectors 178 on the injection apparatus. The block 44 remains clamped by the block restraint 32, and the seedling holder 34 continues to support the seedlings 56 during the injection operation. The injection apparatus 40 is mounted beside the cavity drilling apparatus 36 such that the series of cavity tools 84 are aligned with one row of plugs 90 and the injection apparatus 40 is aligned with the adjacent row of plugs 90(FIG. 1A).

Figure 10:
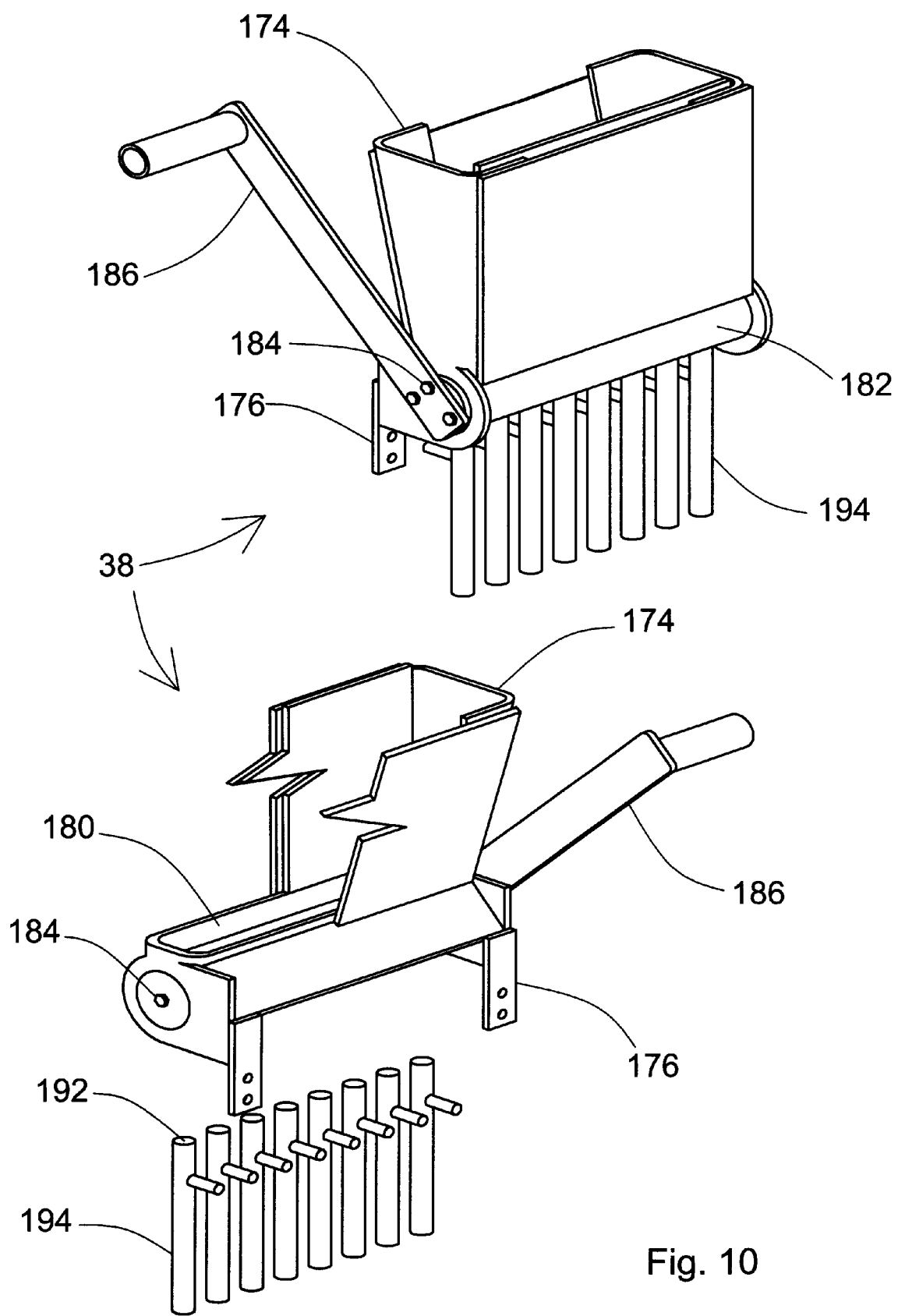
FIG. 10. An isometric view of a metering apparatus, with the injection tube of the injection apparatus exploded therefrom, as shown as part of the invention in FIGS. 1A and 1B.
Figure 11:
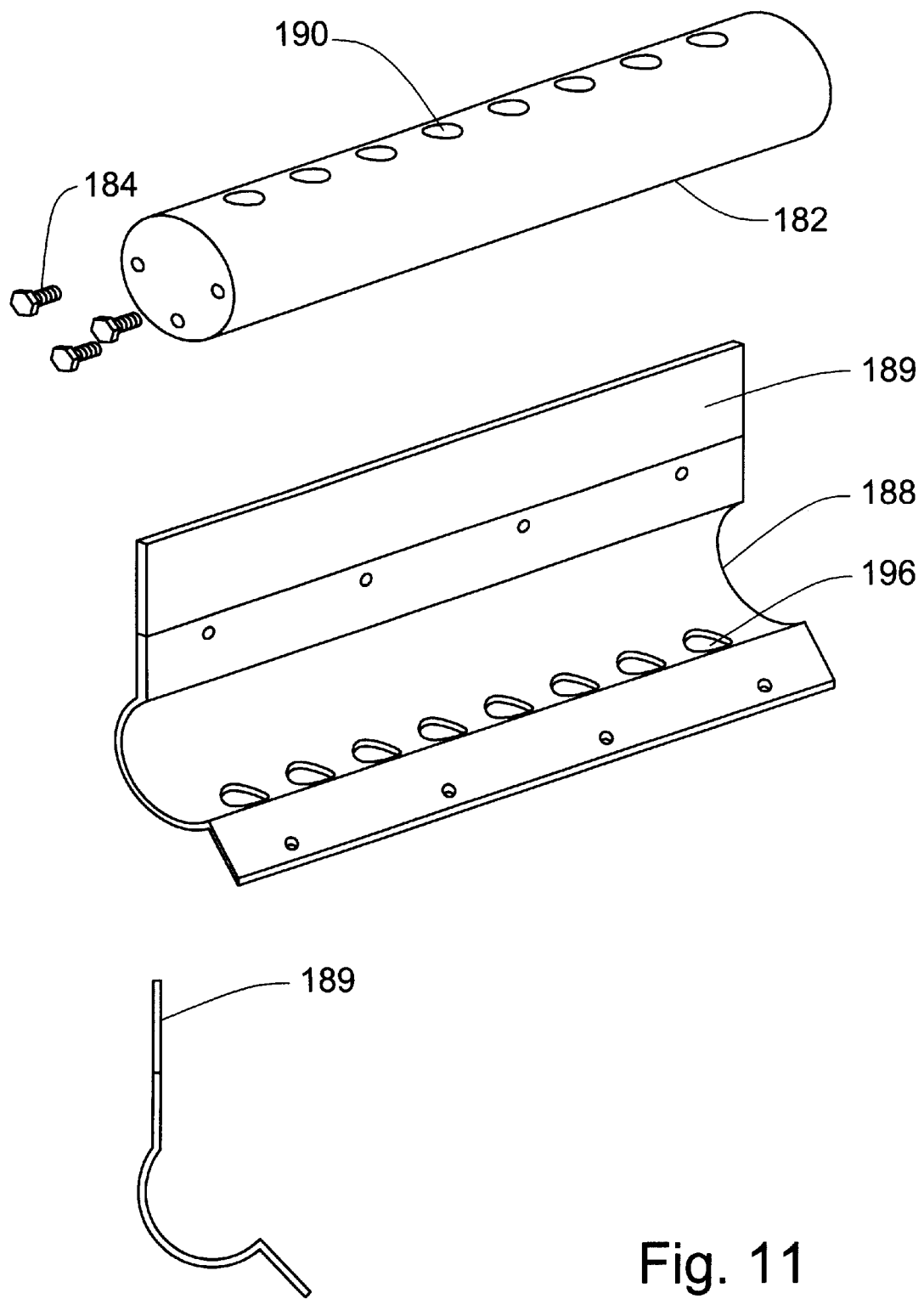
FIG. 11. An explored view of the metering apparatus shown in FIG. 10.

Fertilizer is delivered from a hopper 174 through an orifice 180 to the metering apparatus 38 prior to entry into the injection apparatus 40 (see FIG. 10). The hopper is affixed to the injection slide 158 by a support 176. The metering apparatus 38 is comprised of a metering roller 182, at least two bolts 184 and a perforated cover 188 (see FIG. 11). The perforated cover 188 is affixed to the hopper 174 and the metering roller 182 is rotationally mounted thereon by the bolts 184. Preferably, the perforated cover 188 is provided with a flap 189 that extends along its length.

The metering roller 182 has pockets 190 sized to hold the volume of fertilizer needed in a particular dose. A number of metering rollers 182 are, therefore, available in order to provide a range of doses. For example, a series of 6 rollers deliver 0.5 g, 1.0 g, 1.5 g, 2.0 g, 2.5 g and 3.0 g of a given standard of fertilizer. The metering roller is preferably comprised of a high density plastic polymer. The metering roller 182 rotates, by means of a handle 186 and delivers the doses to a series of inlets 192 of a series of pneumatic injection tubes 194 through perforations 196 of the perforated cover 188 and then continues its rotation to position the pockets 190 below the hopper 174 in order to refill. In this position, air flow from the pneumatic injection tubes 194 into the hopper 174 is impeded. The reduced air flow assists in removing any residual fertilizer from the pockets 190 and assists in removing residual fertilizer from the pneumatic injection tubes 194 prior to refilling.

Figure 3:
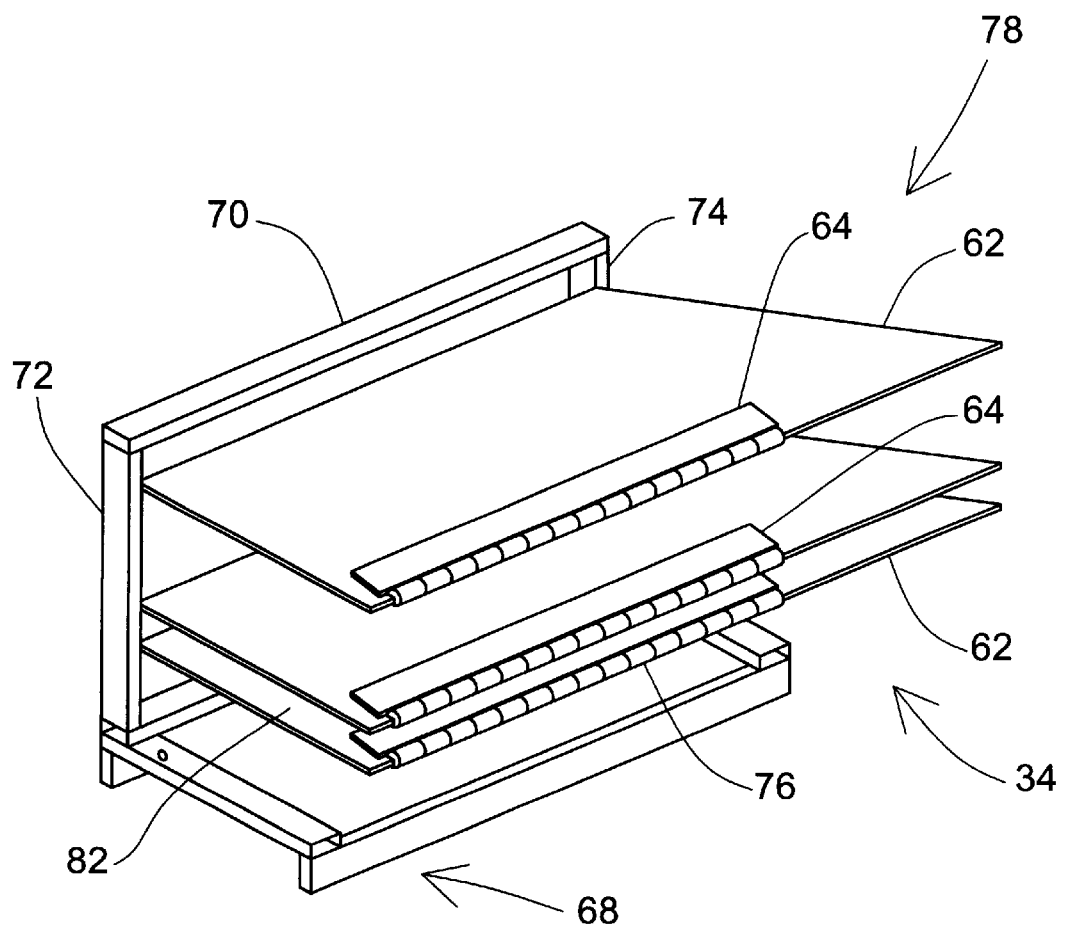
FIG. 3. An isometric view of the seedling holder shown as part of the drill/injector combination of FIGS. 1A and 1B.
Figure 4:
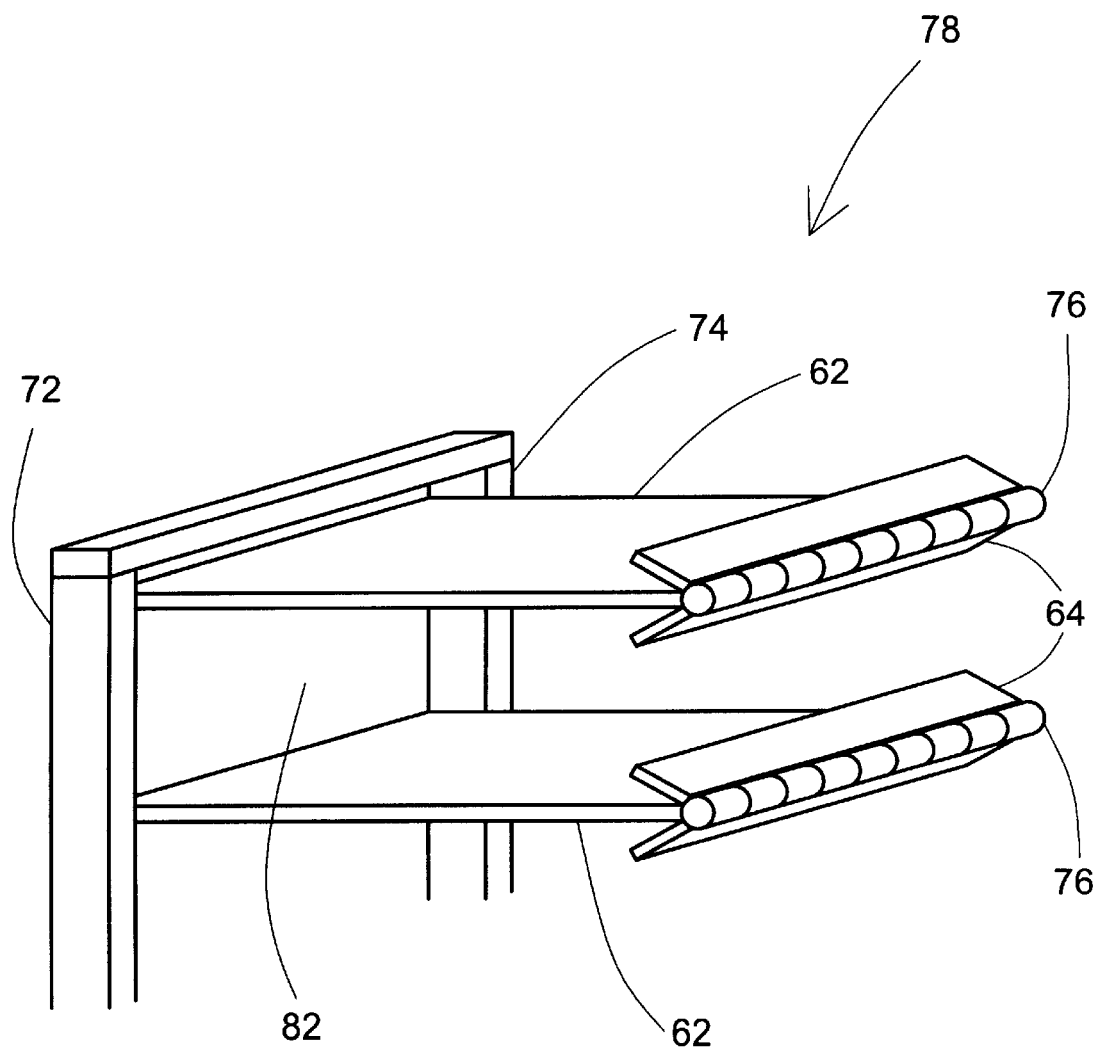
FIG. 4. An isometric view of a part of the seedling holder shown in FIG. 3.
Figure 12:
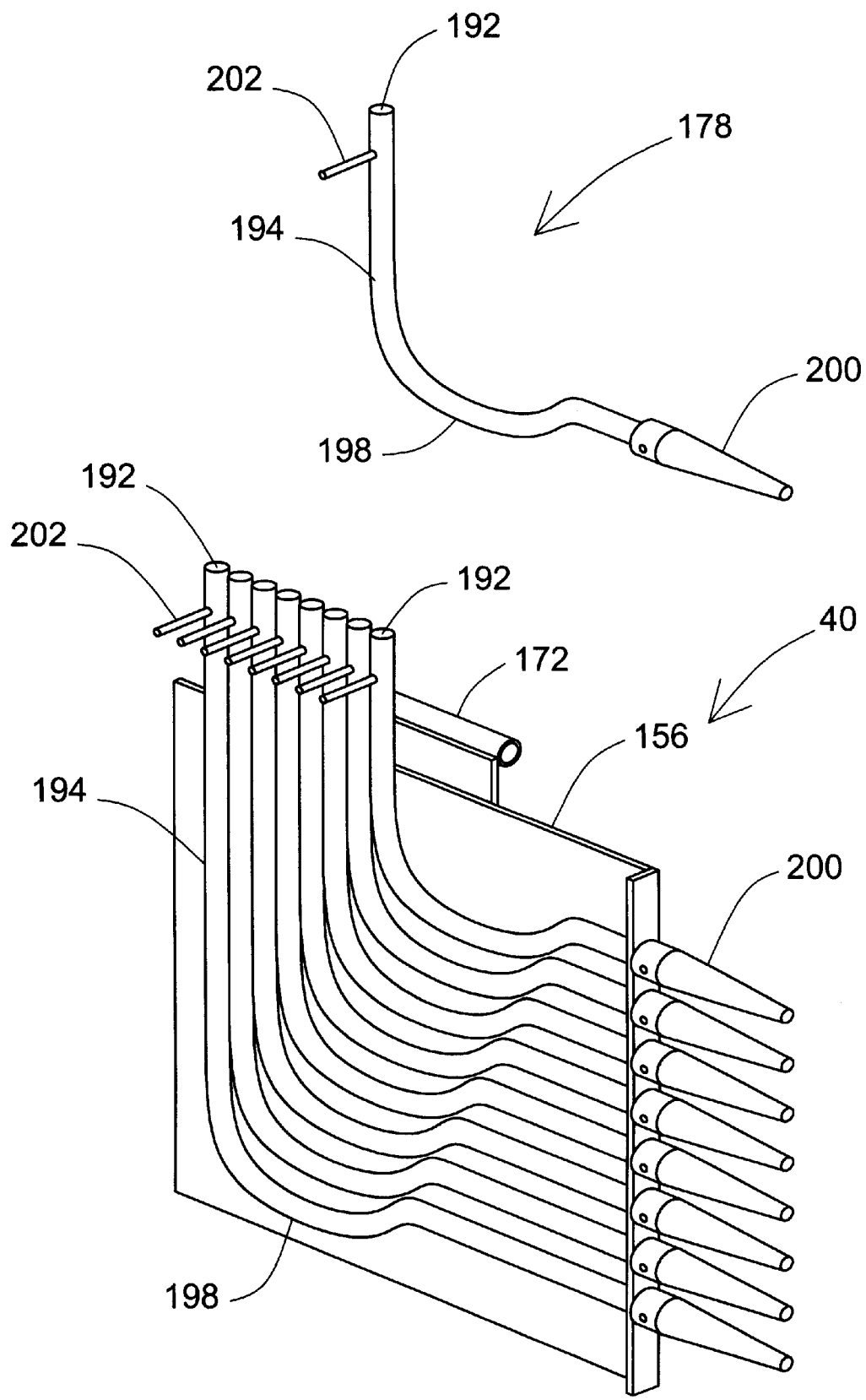
FIG. 12. An isometric view of an injection apparatus as shown as part of the invention in FIGS. 1A and 1B.

Each injector 178 is comprised of a pneumatic injection tube 194, a charge collection chamber 198, a nozzle 200 and a propellant port 202. In one embodiment, the collection chamber 198 is simply a bend in the tube, that projects below both the inlet 192 and the nozzle 200 (see FIG. 12). The propellant port 202 is located between the inlet 192 and the collection chamber 198. It is in pneumatic communication with the pneumatic injection tube 194. Pulses of air enter into the pneumatic injection tube 194 under the control of a charge propulsion means, such as, but not limited to a pneumatic pump (not shown). The velocity and volume of air in a given pulse is controlled by a controller (not shown), for example, a microprocessor, such that a timed sequence of controlled pulses of air are delivered to the pneumatic injection tube. 194. The air pressure is preferably 15+2 psi and the duration of the pulse is preferably 0.6+0.5 second. Each pulse of air propels the fertilizer, which has been delivered to the collection chamber 198 by the metering apparatus 38, into the nozzle 200, which is sized to mate with the bore 86. The air-entrained fertilizer then enters each bore 86 in a selected set of plugs 90 where it is retained. Excess air escapes through the port 88 in the plug 90. The bore 86 has a shoulder 204 formed by the shoulder 134 of the drill bit 84 (see FIGS. 3B and 6). This assists in retaining the fertilizer in the bore 86. After each pulse, the collection chamber 198 of each injector 178 is reloaded with fertilizer.

The injection apparatus 40 is mounted on the same plate 156 that the head 100 of the cavity drilling apparatus 36 is mounted on. Hence, movement into and out of the block 44 is again controlled by sliding the hanger 172 along the support rod 166 of the injection slide 158.

Figure 13:
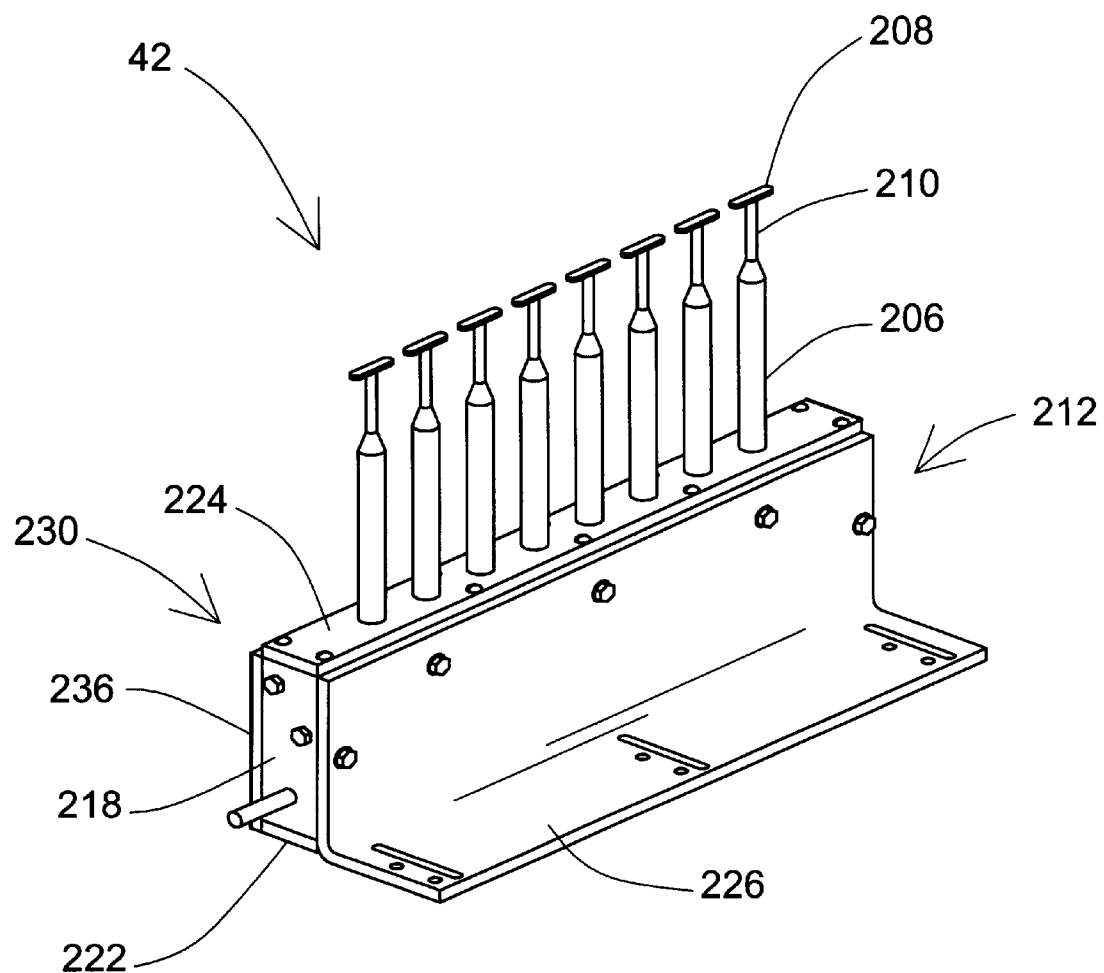
FIG. 13. An isometric view of a bore closing apparatus shown as part of the invention in FIGS. 1A and 1B.

The final step involves closing the bore 86. A bore closer 206 engages the bottom end 96 of the plug 90 and exerts pressure on the bottom end 96 of the plug 90. In one embodiment (see FIG. 13), a paddle 208 is mounted on a distal end 210 of the bore closer 206 and the bore closer is rotated, while pressure is exerted on the bottom end 96 of the plug 90. In another embodiment the bore closer has a concave end (not shown) that accepts the bottom end 96 of the plug 90.

Figure 14:
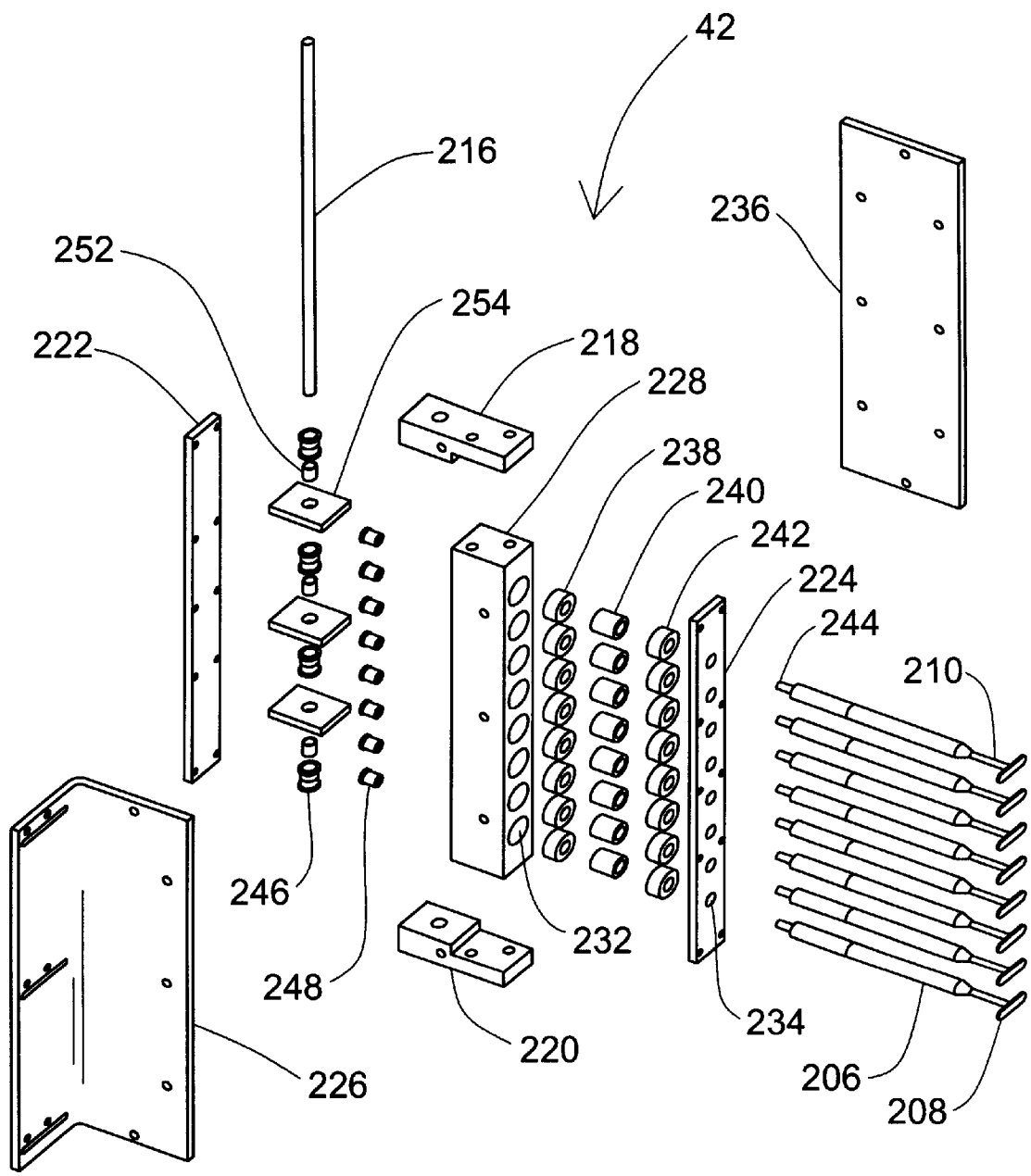
FIG. 14. An exploded view of a bore closing apparatus shown in FIG. 13.

Proper alignment and operation of the bore closers 206 is provided by the bore closing apparatus 42. Preferably, the bore closing system 42 is comprised of a head 212 that retains a series of bore closers 206 that are coupled to a drive shaft 216 (see FIG. 14). The bore closers 206 are aligned along the head 212 such that they will be in alignment with the plugs 90 in at least one row. Preferably, the head 212 is sufficiently large enough to hold a gang of bore closers 206 corresponding in number and location with the plugs 90 in a 410 block 44. It is proposed that different heads 212 will be available for different block sizes.

The head 212 is comprised of two opposing sides 218, 220, a base 222, a top 224, a mount 226, a dust cap 236 and a bore closer holder 228. The sides 218, 220, base 222, top 224 and dust cap 236 are attached to one another to form a box 230. The bore closer holder 228 is housed in the box 230 and is attached to the sides 218, 220 of the box 230. Apertures 232 in the bore closer holder 228 are located so as to be in register with the plugs 90 of the block 44. Similarly, the top 224 has a series of openings 234 that are in register with the plugs 90 of the block 44. The bore closers 206 are positioned such that one closer 206 is aligned with one opening 234 and a corresponding aperture 232. This aligns one drill bit 84 with one plug 90.

The mount 226 attaches the bore closing apparatus 42 to the same plate 156 to which the head 100 of the cavity drilling apparatus 36 is attached. Hence movement into and out of the block 44 is again controlled by sliding the hanger 172 along the support rod 166 of the injection slide 158. The dust cap 236 impedes entry of dust into the head 212.

Rotatably mounted proximally on the bore closer 206 is an inner bearing 238, a spacer 240 and an outer bearing 242. The bearings 238, 242 rotatably mount the bore closer 206 in the bore closer holder 228. A proximal end 244 of the bore closer 206 is mated to a first mitre gear 246 in order to drive the bore closer 206. A second mitre gear 248 engages the first mitre gear 246 with a peripheral rotary engagement of approximately 90 degrees. The second mitre gear 248 is mounted coaxially on the drive shaft 216 and is driven by the shaft A guide 252 on either side of the second mitre gear spaces it from spanners 254. The drive shaft 216 is rotatably mounted on the spanners 254, which bridge the bore closer 206 and the top 224 of the head 212. The bore closer 206 preferably rotates at 10–400 rpm.

Figure 15:
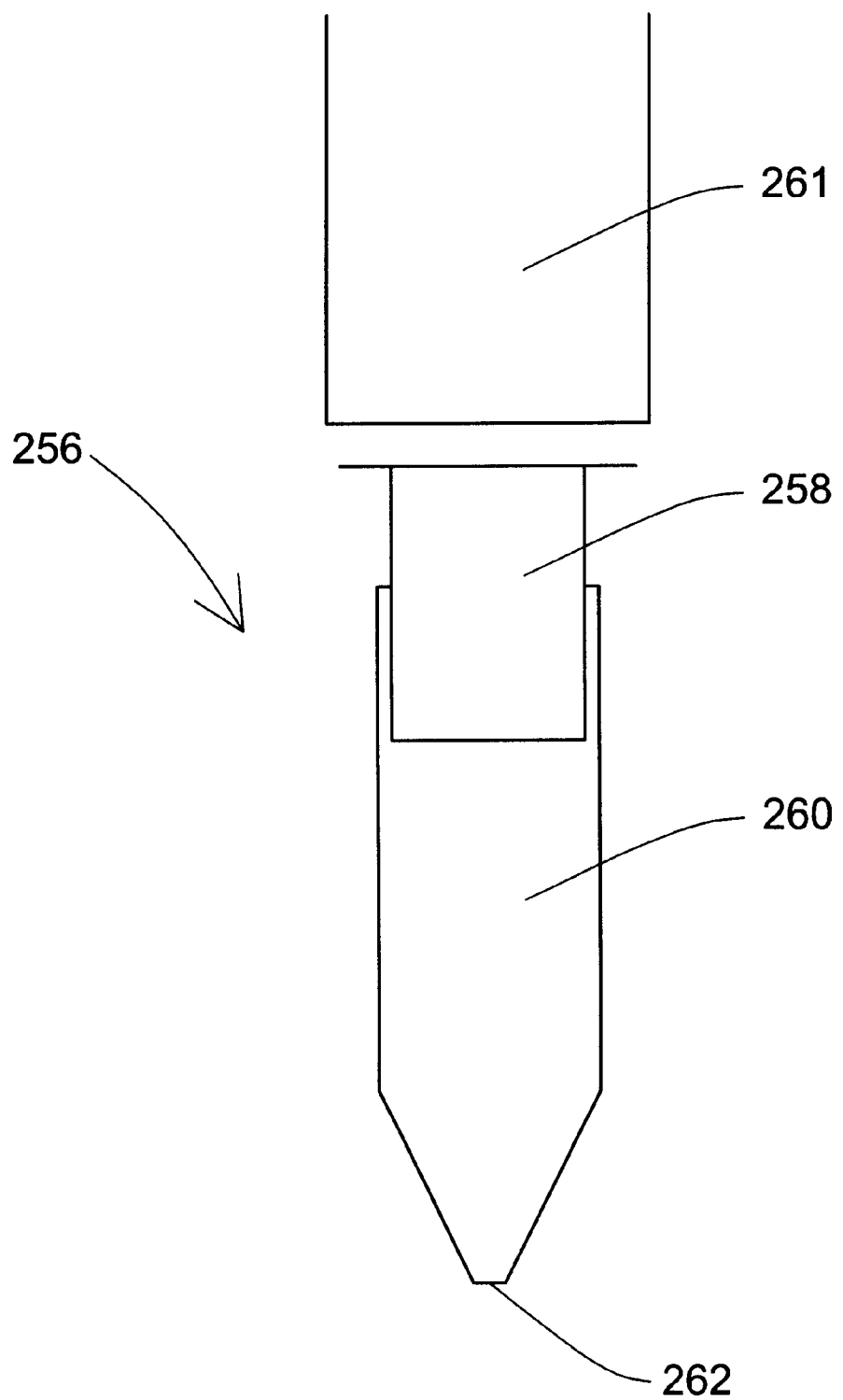
FIG. 15. An exploded cross section of a second embodiment of the invention, showing a paste extruder.
Figure 16:
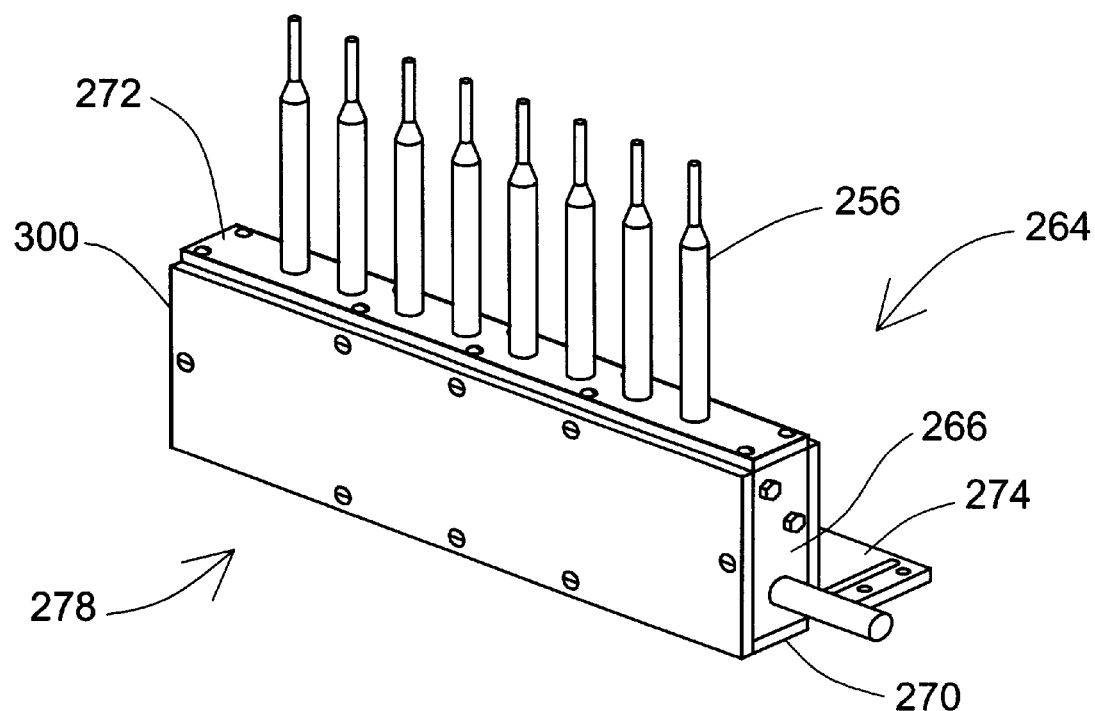
FIG. 16. An isometric view of a second embodiment of the invention showing a paste extruder head.
Figure 17:
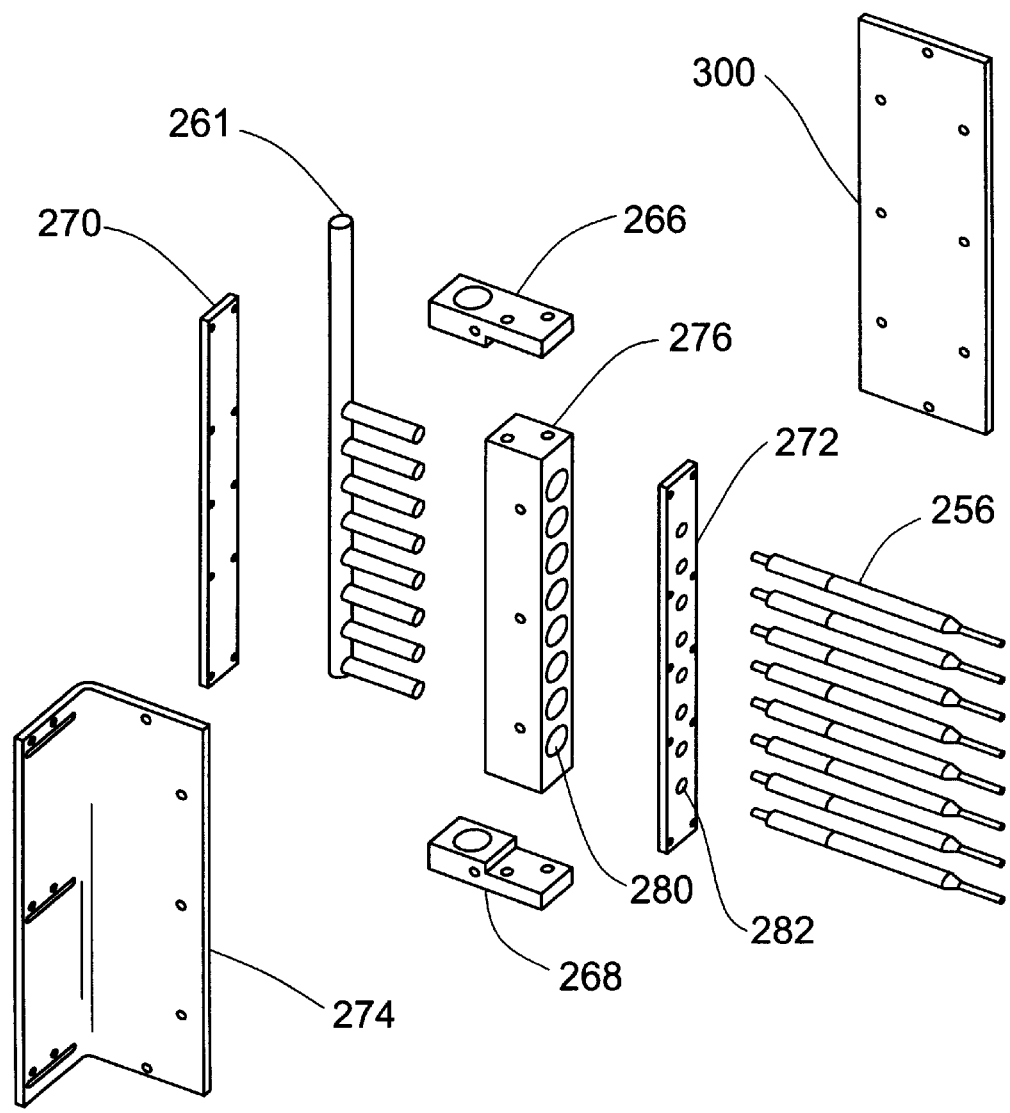
FIG. 17. An exploded view of the paste extruder head shown in FIG. 16.

In a second embodiment there is provided a paste extruder 256 as a means for closing the bore 86 (see FIG. 15). A suitable paste is biodegradable and is sufficiently viscose to remain in the bore 86 after injection. The paste extruder 256 is preferably air-actuated and has a plunger 258 housed within a chamber 260. The plunger is depressed when air is forced through a pneumatic tube 261. The chamber 260 has an aperture 262 distal to the plunger 258. Actuation of the plunger 258 forces a predetermined amount of paste from the chamber 260, through the aperture 262 and into the bore 86 of the plug 90. The aperture 262 is sized to fit in the small hole 92 in the bottom of the plug cavity 94 and is preferably also sized to enter into the bore 86. The depth of the extrusion is controlled by the force exerted on the plunger 258, the viscosity of the paste and depth of the paste extruder 256 in the bore 86.

A series of paste extruders 256 are mounted on a head 264 that is similar to that described above. The paste extruders 256 are aligned along the head 264 such that they will be in alignment with the plugs 90 in at least one row. Preferably, the head 264 is sufficiently large enough to hold a gang of paste extruders 256 corresponding in number and location with the plugs 90 in a 410 block 44. It is proposed that different heads 264 will be available for different block sizes or configurations.

The head for the paste extruders 256 is comprised of two opposing sides 266, 268, a base 270, a top 272, a mount 274, a dust cap 300 and a paste extruder holder 276. The sides 266, 268, base 270, top 272 and dust cap 300 are attached to one another to form a box 278. The paste extruder holder 276 is housed in the box 278 and is attached to the sides of the box 278. Apertures 280 in the paste extruder holder 276 are located so as to be in register with the plugs 90 of the block 44. Similarly, the top 272 has a series of openings 282 that are in register with the plugs 90 of the block 44. Each paste extruder 256 is positioned in the opening 282 and the corresponding aperture 280 in order to be aligned with the plug 90.

Figure 18:
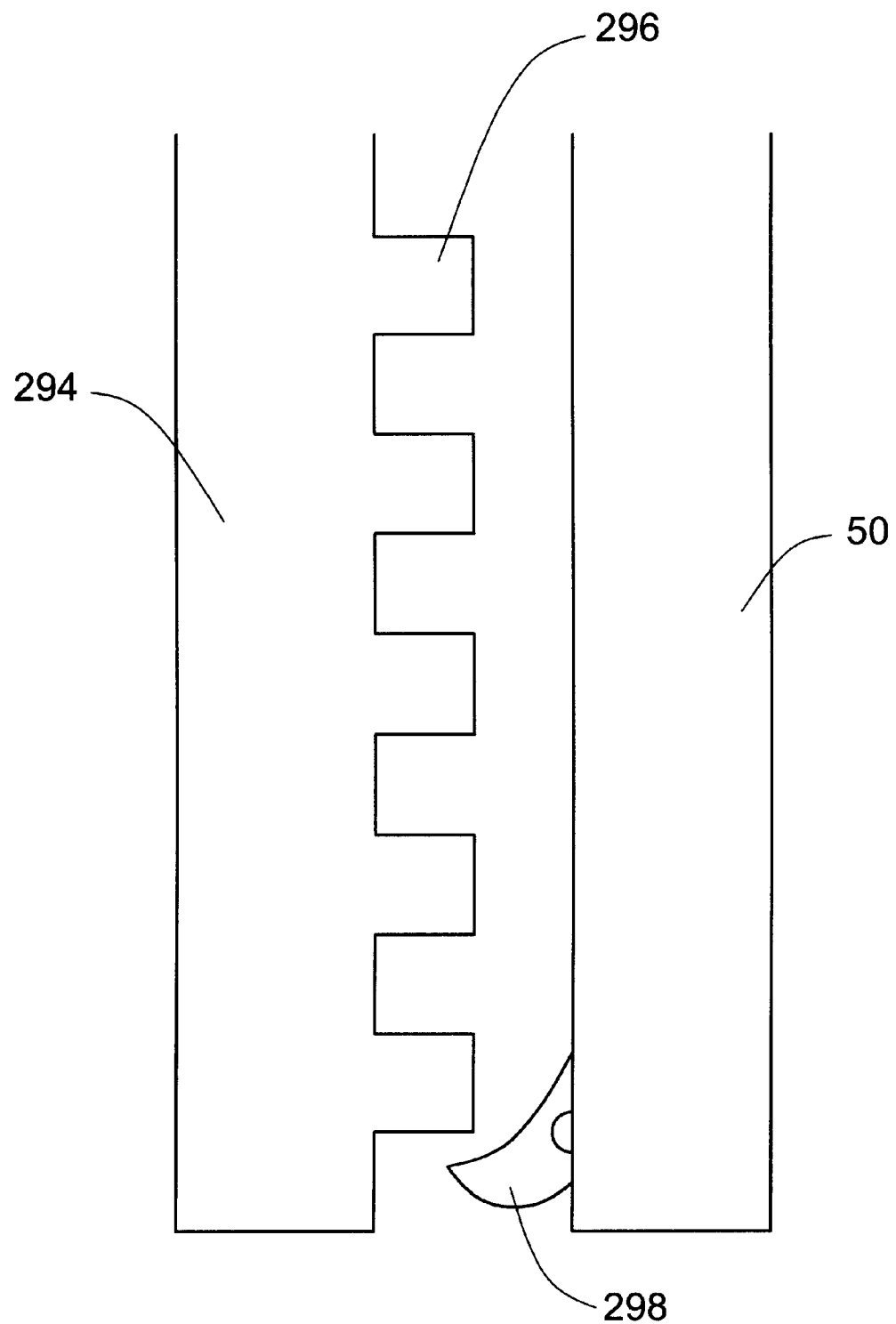
FIG. 18. A plan view according to the invention showing an indexing bar and a dog, mounted to the receiving tray.

During the injection process, it is be necessary to reposition the block restraint 32 and the seedling holder 34 to align the drill/injector combination 30 with rows of plugs 90 that have not been injected. Contact points between the receiving tray 50 and both the block restraint 32 and seedling holder 34 are preferably coated with a material such as a high density plastic polymer to reduce friction. The block 44 may be repositioned as needed by manually releasing and moving the block restraint 32 and seedling holder 34 along an indexing bar 294. Different indexing bars 294 corresponding to different block sizes can be used as needed. The indexing bar 294 has a series of stops 296 that are spaced for alignment with the plugs 90 in a block 44 (FIG. 18). The indexing bar 294 is affixed to the seedling holder 34 and is positioned to accept a dog 298 mounted on the receiving tray 54. Engagement of a stop 296 with the dog 298 facilitates alignment of the various tools and injectors with the plugs 90.

Once aligned, the cavity drilling apparatus 36, the injection apparatus 40 and the bore closing apparatus 42 can be moved into and away from the block 44 along the injection slide 158. The movement is controlled by a press (not shown) which is preferably hydraulically actuated.

Preferable, the cavity drilling apparatus 36, the injection apparatus 40 and the bore closing apparatus 42 are mounted on the injection slide 158 to enable drilling in at least one self-contained set of plugs 90, while at the same time, injection is occurring in at least one adjacent self-contained set of plugs 90, and closing is occurring in at least one self-contained set of plugs 90 adjacent to self-contained set of plugs 90 being injected. The set of plugs 90 may be a row of plugs 90 or may be an entire block 44 of plugs 90, provided that the plugs 90 may be maintained in satisfactory alignment for the drilling, injecting and closing operations. Preferably, the operations of drilling, metering, injecting and closing occur recurrently, with restraining the block 44 and holding the seedlings 56 being in synchrony with these operations and occurring recurrently.

Once the block 44 of plugs 90 has been fertilized and the bore 86 closed, the seedling holder 34 is disengaged, the block restraint 32 is disengaged and the block 44 is moved onto the lifting conveyor 58.

The foregoing description of injecting fertilizer into plugs at lift describes the preferred methods and is not meant to be limiting. As would be apparent to one skilled in the art, there can be, for example, variation in the degree of mechanization, the mode of restraining and supporting the blocks and seedlings and the type of container that is restrained. Fertilizer may be delivered into the bore in the plug in a variety of ways, including in a fluid. Further, while the foregoing description is premised by way of example upon injection of fertilizer, a variety of different materials can be injected. For example, encapsulated biological material selected from the group consisting of bacteria, fungi, nematodes, virus, and combinations thereof, pesticides, including herbicides, insecticides, and herbivore deterrents, hygroscopic materials, seed and growth adjuvants could be injected. Finally, a variety of materials may be injected into a plug that does not contain a seedling. For example, the method can be used to seed plugs. Similarly, it can deliver material into a plug in which a plant, rather than a seedling is growing.

What is claimed is:

1. A drill/injector combination for use with a suitable selected charge propulsion means, for injecting a predetermined discrete charge of plant growth modulator into a plug, comprising:
   a cavity drilling tool for rotary coupling to a suitable selected drive, having a rotatable drill bit for drilling a bore in the plug, and having means operable to advance the tool when rotating into the plug by a predetermined distance thereby to create the bore and operable to retract the tool from the plug following the creation of the bore;
   an injector for coupling to the charge propulsion means and operable to inject the charge into the bore; and
   metering apparatus coupled to the injector for dispensing to the injector a metered amount of plant growth modulator constituting at least a portion of said charge.

2. The drill/injector combination of claim 1 further comprising an alignment means for successively aligning the plug with the cavity drilling tool and with the injector.

3. The combination of claim 2, including means controlling the operation of the cavity drilling tool and the injector and the alignment means, for cycling the drilling and injection operations so that a series of plugs may be drilled and injected in sequence.

4. The drill/injector combination of claim 2, wherein the drill bit has a wide body, a narrow distal tip and a shoulder between the body and the tip.

5. The drill/injector combination of claim 4 wherein the drill bit is symmetrical about its axis of rotation.

6. The drill/injector combination of claim 5 wherein the drill bit is made of material selected to promote flexing and bending of the drill bit during use.

7. The drill/injector combination of claim 2 further comprising a bore closing tool for rotary coupling to a suitable selected drive, comprising;
   a rotatable bore closer for closing a bore in the plug;
   means recurrently operable to advance the rotating bore closer by a predetermined distance thereby to close the bore and recurrently operable to retract the bore closer from last mentioned plug following closing of the bore;
   and means to couple the bore closing tool to the alignment means.

8. The drill/injector combination as claimed in claim 2 wherein the propellant is fluid.

9. A drill/injector combination for cyclable use with a suitable selected charge propulsion means, for cyclable operation to inject a predetermined discrete charge of plant growth modulator into each plug in a succession of plugs arranged in sets of plugs, each said set being arranged as a predetermined array of plugs, comprising:

cavity drilling apparatus comprising an array of cavity drilling tools mating with the array of plugs for one-to-one alignment of the drilling tools with the plugs; each said drilling tool having a rotatable drill bit for drilling a bore in the plug and being mounted in the cavity drilling apparatus for rotary coupling to a suitable selected drive for simultaneously rotating the rotatable drill bits;

means recurrently operable to advance the rotating drill bits together into successive sets of said plugs by a predetermined distance thereby to create the bores and recurrently operable to retract the drill bits together from said last-mentioned plugs following the creation of the bores;

injection apparatus comprising an array of injectors for coupling to the charge propulsion means and recurrently operable to inject the charges into the bores of successive sets of said plugs; said array of injectors mating with the array of plugs for one-to-one alignment of the injectors with the plugs;

metering apparatus for recurrently dispensing to each of the injectors a metered amount of plant growth modulator; and p1 alignment means for recurrently aligning successive sets of the plugs with the drill bits and with the injectors.

10. The combination of claim 9, wherein the array of plugs is a linear array of equally spaced plugs, the injectors and drilling tools are mounted in mating linear arrays, and the alignment means is operable to move the array of plugs consecutively into alignment first with the drilling tools and then with the injectors.

11. The combination of claim 10, wherein the injectors and drilling tools are mounted in parallel linear arrays.

12. The combination of claim 10, wherein each said injector comprises a proximal charge collection chamber coupled to the metering apparatus for receiving the charge from the metering apparatus;

a propellant port in proximal communication with the collection chamber for applying propellant to the charge in the collection chamber in response to operation of the charge propulsion means thereby to propel the charge out of the collection chamber; and a nozzle in distal communication with the collection chamber and whose distal tip is in operation aligned with a mating one of said bores, for delivery of the propelled charge into the last-mentioned bore.

13. The drill/injector combination of claim 9 further comprising a restraint means for receiving and releasably restraining a block of plugs and a means for releasably coupling said restraint means to the alignment means.

14. The drill/injector combination of claim 13 further comprising a seedling holder for supporting a set of plants contained in an array of plugs, said seedling holder having a series of guides spaced to receive and support the set of plants and means to releasably couple the seedling holder to the restraint means.

15. The drill/injector combination of claim 14, wherein the seedling holder further comprises a series of dividers, said dividers being connectible to a suitable actuator and spaced to receive a set of plants in an OPEN position and to hold the set of plants in the CLOSED position, said actuator having means to recurrently urge the dividers between the OPEN and CLOSED positions.

16. The drill/injector combination of claim 15 wherein the dividers are comprised of a pliable material for holding the plants.

17. The drill/injector combination of claim 9 further comprising a bore closing tool for rotary coupling to a suitable selected drive, having a rotatable bore closer for closing a bore in the plug, and means recurrently operable to advance the rotating bore closer by a predetermined distance thereby to close the bore and recurrently operable to retract the bore closer from last mentioned plug following closing of the bore.

18. The drill/injector combination as claimed in claim 9 wherein the propellant is air.

19. The drill/injector combination of claim 18 wherein the collection chamber is dimensioned and configured, and the propellant pressure and delivery pulse are selected so that the pulse air-entrains the charge.

20. The drill/injector combination as claimed in claim 19 additionally comprising means for recurrently pneumatically actuating the injection apparatus.

21. The drill/injector combination as claimed in claim 19 comprising means for recurrently hydraulically actuating the injection apparatus.

22. A drill/injector combination for cyclable use to inject a predetermined discrete charge of plant growth modulator into each plug in a succession of plugs arranged in sets of plugs, each said set being arranged as a predetermined array of plugs, comprising:

cavity drilling apparatus comprising an array of cavity drilling tools mating with the array of plugs for one-to-one alignment of the drilling tools with the plugs; each said drilling tool having a rotatable drill bit for drilling a bore in the plug and being mounted in the cavity drilling apparatus for rotary coupling to a suitable selected drive for simultaneously rotating the rotatable drill bits;

means recurrently operable to advance the rotating drill bits together into successive sets of said plugs by a predetermined distance thereby to create the bores and recurrently operable to retract the drill bits together from said last-mentioned plugs following the creation of the bores;

injection apparatus comprising an array of injectors coupled to a charge propulsion means for recurrent injection of the charges into the bore;

said propulsion means having an ON position and an OFF position such that in the ON position the propellant is delivered from a source of propellant to the injector thereby to propel the charge into the aligned bore, and in the OFF position, the propellant is impeded from delivery from the source to the injector;

said array of injectors mating with the array of plugs for one-to-one alignment of the injectors with the plugs;

metering apparatus for recurrently dispensing to each of the injectors a metered amount of plant growth modulator; and alignment means for recurrently aligning the plugs with the drill bits and with the injectors.

23. The drill/injector combination of claim 22, wherein the drill bit has a wide body, a narrow distal tip and a shoulder between the body and the tip.

24. The drill/injector combination of claim 23 wherein the drill bit is symmetrical about its axis of rotation.

25. The drill/injector combination of claim 24 wherein the drill bit comprises a material selected to promote flexing and bending of the drill bit during use.

26. The drill/injector combination of claim 22, further comprising a restraint means recurrently operable to receive and releasably restrain a block of plugs and a means for releasably coupling said restraint means to the alignment means.

27. The drill/injector combination of claim 26, wherein the means for releasably coupling the restraint means to the alignment means operates in synchrony with the cyclic drilling and injection steps.

28. The drill/injector combination of claim 26 further comprising a seedling holder for supporting a set of plants contained in an array of plugs, said seedling holder having a series of guides spaced to receive and support the set of plants and means to recurrently couple the seedling holder to the restraint means.

29. The drill/injector combination of claim 28, wherein the seedling holder further comprises a series of dividers, said dividers being connectible to a suitable actuator and spaced to receive a set of plants in an OPEN position and to hold the set of plants in the CLOSED position, said actuator to recurrently urge the dividers between the OPEN and CLOSED positions.

30. The drill/injector combination of claim 29 wherein the dividers are comprised of a pliable material for holding the plants.

31. The drill/injector combination of claim 29, wherein the actuator operates in synchrony with the cyclic drilling and injection steps to recurrently urge the dividers between the OPEN and CLOSED position.

32. The drill/injector combination of claim 22 further comprising a bore closing apparatus comprising an array of bore closing tools mating with the array of plugs for one-to-one alignment of the bore closing tools with the plugs; each said bore closing tool having a rotatable bore closer for closing a bore in the plug and being mounted in the bore closing apparatus for rotary coupling to a suitable selected drive for simultaneously rotating the rotatable bore closers; and means recurrently operable to advance the rotating bore closers together in successive sets of said plugs by a predetermined distance thereby to close the bores and recurrently operable to retract the bore closers together from last mentioned plugs following closing of the bores.

33. A drill/injector combination for cyclable use to inject a predetermined discrete charge of plant growth modulator into each plug in a succession of plugs arranged in sets of plugs, each said set being arranged as a predetermined array of plugs, comprising:

cavity drilling apparatus comprising an array of cavity drilling tools mating with the array of plugs for one-to-one alignment of the drilling tools with the plugs; each said drilling tool having a rotatable drill bit for drilling a bore in the plug and being mounted in the cavity drilling apparatus for rotary coupling to a suitable selected drive for simultaneously rotating the rotatable drill bits;

a charge propulsion means for propelling the charges into the bores;

injection apparatus comprising an array of injectors coupled to the charge propulsion means;

said propulsion means having an ON position and an OFF position such that in the ON position the propellant is delivered from a source of propellant to the injector thereby to propel the charge into the aligned bore, and in the OFF position, the propellant is impeded from delivery from the source to the injector, said array of injectors mating with the array of plugs for one-to-one alignment of the injectors with the plugs;

metering apparatus coupled to the injection apparatus, for one-to-one alignment with the injectors, comprised of a metering roller, a perforation cover and a coupling means, said metering roller being rotatably attached to the perforation cover and being connectible to a suitable drive, said metering roller having peripherally located pockets of a defined volume to collect the plant growth modulator in a first position, dispense the predetermined amount of plant growth modulator into the collection chamber and recharge when returned to the first position;

a restraint means for receiving and releasably restraining a block of plugs and a means for releasably coupling said restraint means to an alignment means;

a seedling holder for supporting a set plants contained in an array of plugs, said seedling holder having a series of guides spaced to receive the set of plants and means to releasably couple the seedling holder to the restraint means;

a bore closing apparatus comprising an array of bore closing tools mating with the array of plugs for one-to-one alignment of the bore closing tools with the plugs; each said bore closing tool having a rotatable bore closer for closing a bore in the plug and being mounted in the bore closing apparatus for rotary coupling to a suitable selected drive for simultaneously rotating the rotatable bore closers;

alignment means for successively aligning the plugs with the drill bits, the injectors and the bore closers; and repositioning means, operable to move the array of plugs consecutively into alignment first with the drill bits, then with the injectors and then with the bore closers, such that an array of plugs is being drilled, while the adjacent drilled array of plugs is being injected and the injected array of plugs is being closed.

34. The drill/injector combination of claim 33, further comprising control means connected to and operable to recurrently actuate the charge propulsion means and the metering apparatus in synchronism; whereby after each delivery of propellant by the propulsion means to the injectors, a remetered charge is dispensed from the metering apparatus to each of the injectors.

* * * * *